(12) United States Patent
Sayed Hassan et al.

(10) Patent No.: US 11,949,543 B1
(45) Date of Patent: Apr. 2, 2024

(54) PEAK TO AVERAGE POWER RATIO REDUCTION BY ADDING CONSTRAINTS ON PHASE TRANSITION BETWEEN MODULATION SYMBOLS

(71) Applicant: QUALCOMM Incorporated, San Diego, CA (US)

(72) Inventors: Mohamad Sayed Hassan, Paris (FR); Jun Ma, San Diego, CA (US); Lianghai Ji, San Diego, CA (US); Liangping Ma, San Diego, CA (US); Huilin Xu, Temecula, CA (US); Weimin Duan, San Diego, CA (US); Karthik Anantha Swamy, La Jolla, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/934,427

(22) Filed: Sep. 22, 2022

(51) Int. Cl.
*H04L 27/26* (2006.01)

(52) U.S. Cl.
CPC ...... *H04L 27/2615* (2013.01); *H04L 27/2636* (2013.01)

(58) Field of Classification Search
CPC ............ H04L 5/0007; H04L 27/2614; H04L 27/2615; H04L 27/2636; H04L 1/0004; H04L 1/0005; H04L 1/0009
See application file for complete search history.

(56) References Cited

U.S. PATENT DOCUMENTS

| | | | |
|---|---|---|---|
| 2018/0062904 A1 | 3/2018 | Hwang et al. | |
| 2021/0218607 A1* | 7/2021 | Ait Aoudia | G06F 17/16 |
| 2022/0006532 A1* | 1/2022 | Elzanaty | H04B 10/503 |
| 2023/0033774 A1* | 2/2023 | Koike-Akino | H04L 27/2621 |

OTHER PUBLICATIONS

International Search Report and Written Opinion—PCT/US2023/032556—ISA/EPO—Jan. 17, 2024.
Liu Y., et al., "Novel Radar and Communication Integration Waveform Based on Shaped Octal Phase-shift Keying Modulation", Physical Communication, Elsevier, Amsterdam, NL, Vol. 38, Dec. 20, 2019, 10 Pages, XP086003234, Section 2.

(Continued)

*Primary Examiner* — David S Huang
(74) *Attorney, Agent, or Firm* — Procopio, Cory, Hargreaves & Savitch LLP

(57) ABSTRACT

The apparatus may be provided to improve a PAPR in at least one of a single-carrier FDM signal or DFT-s-OFDM. The apparatus may be configured to encode a set of information bits with a channel encoder; generate, based on a set of encoded bits from the channel encoder, a set of amplitude symbols using a distribution matching function; generate a set of modulated symbols based on the set of amplitude symbols; and transmit, to a second device, a signal based on the set of modulated symbols. An apparatus may be configured to receive, from a first device, a signal based on a set of modulated symbols and derive a set of encoded bits based on the received set of modulated symbols using a distribution matching function.

28 Claims, 14 Drawing Sheets

(56) References Cited

OTHER PUBLICATIONS

Nasarre I.P., et al., "Constrained PSK: Energy-Efficient Modulation for Sub-THz Systems", 2020 IEEE International Conference On Communications Workshops (ICC Workshops), IEEE, Jun. 7, 2020, 7 Pages, XP033796102, Figures 1, 2, Section II.
Tanahashi M., et al., "Symbol Insertion: A Low-Complexity Joint Peak Power Reduction and Forward Error Correction for Single-Carrier Systems", IEEE Transactions on Communications, IEEE Service Center, Piscataway, NJ. USA, Vol. 58, No. 11, Nov. 1, 2010, pp. 3244-3253, 10 pages, XP011319597, ISSN: 0090-6778, DOI: 10.1109/TCOMM.2010.093010.080482, Figures 1-3, Sections I and II.

* cited by examiner

PEAK TO AVERAGE POWER RATIO REDUCTION BY ADDING CONSTRAINTS ON PHASE TRANSITION BETWEEN MODULATION SYMBOLS

TECHNICAL FIELD

The present disclosure relates generally to communication systems, and more particularly, to wireless communication including the transmission of encoded bits.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be provided to improve a peak to average power ratio (PAPR) in at least one of a single-carrier frequency division multiplexed (FDM) signal or discrete Fourier transform (DFT) spread orthogonal frequency division multiplexing (OFDM) (DFT-s-OFDM). The apparatus may be configured to encode a set of information bits with a channel encoder. The apparatus may also be configured to generate, based on a set of encoded bits from the channel encoder, a set of amplitude symbols using a distribution matching function. The apparatus may be configured to generate a set of modulated symbols based on the set of amplitude symbols. The apparatus may further be configured to transmit, to a second device, a signal based on the set of modulated symbols.

In an aspect of the disclosure, a method, a computer-readable medium, and an apparatus are provided. The apparatus may be configured to improve a PAPR in at least one of a single-carrier FDM signal or DFT-s-OFDM. The apparatus may be configured to receive, from a first device, a signal based on a set of modulated symbols. The apparatus may also be configured to derive a set of encoded bits based on the received set of modulated symbols using a distribution matching function.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
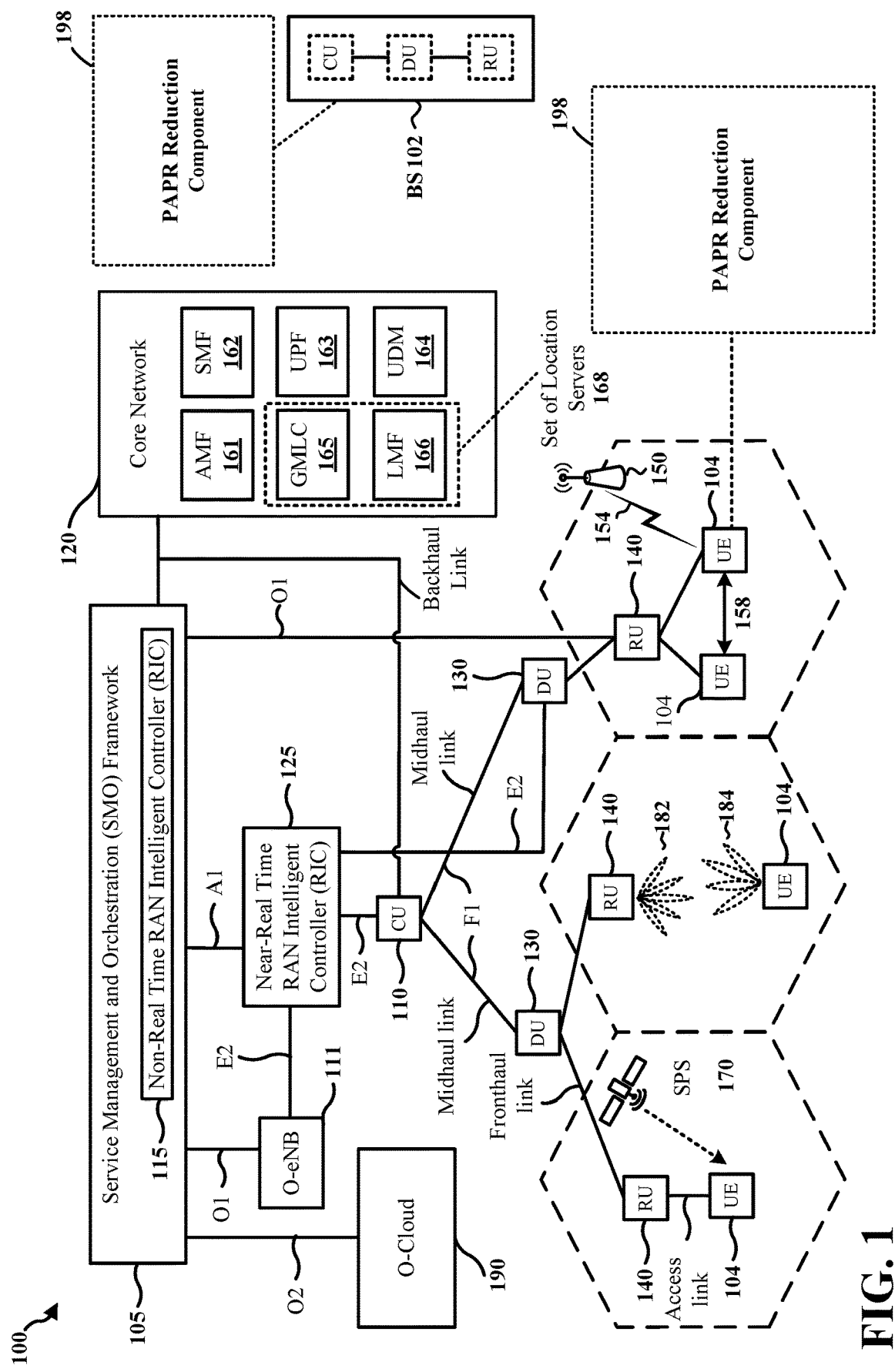
FIG. 1 is a diagram illustrating an example of a wireless communications system and an access network.

In some aspects of wireless communication, a non-linearity of a power amplifier (PA) at a transmitting device may result in distortions of signals and increased error vector magnitude (EVM) at a receiving device. The non-linearity may be experienced at higher powers, e.g., past a saturation point. In order to maintain linearity of the PA, a transmitter may employ a backoff that reduces a total power to reduce distortion to the signal. When transmitting a waveform associated with a higher PAPR, a transmitting device may use a larger backoff to maintain linearity of the PA. In order to increase total power for a particular waveform, a method may be employed to reduce the PAPR associated with the particular waveform to allow for a smaller backoff.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a transmitting device (e.g., the UE 104 or the base station 102) may include a PAPR reduction component 198 that may be configured to encode a set of information bits with a channel encoder. The PAPR reduction component 198 may also be configured to generate, based on a set of encoded bits from the channel encoder, a set of amplitude symbols using a distribution matching function. The PAPR reduction component 198 may be configured to generate a set of modulated symbols based on the set of amplitude symbols. The PAPR reduction component 198 may further be configured to transmit, to a second device, a signal based on the set of modulated symbols. In certain aspects, a receiving device (e.g., the base station 102 or the UE 104) may also include a PAPR reduction component 198 that may be configured to receive, from a first device (e.g., a transmitting device), a signal based on a set of modulated symbols. The PAPR reduction component 198 at the receiving device may also be configured to derive a set of encoded bits based on the received set of modulated symbols using a distribution matching function. Although the following description may be focused on 5G NR, the concepts described herein may be applicable to other similar areas, such as LTE, LTE-A, CDMA, GSM, and other wireless technologies.

Figure 2:
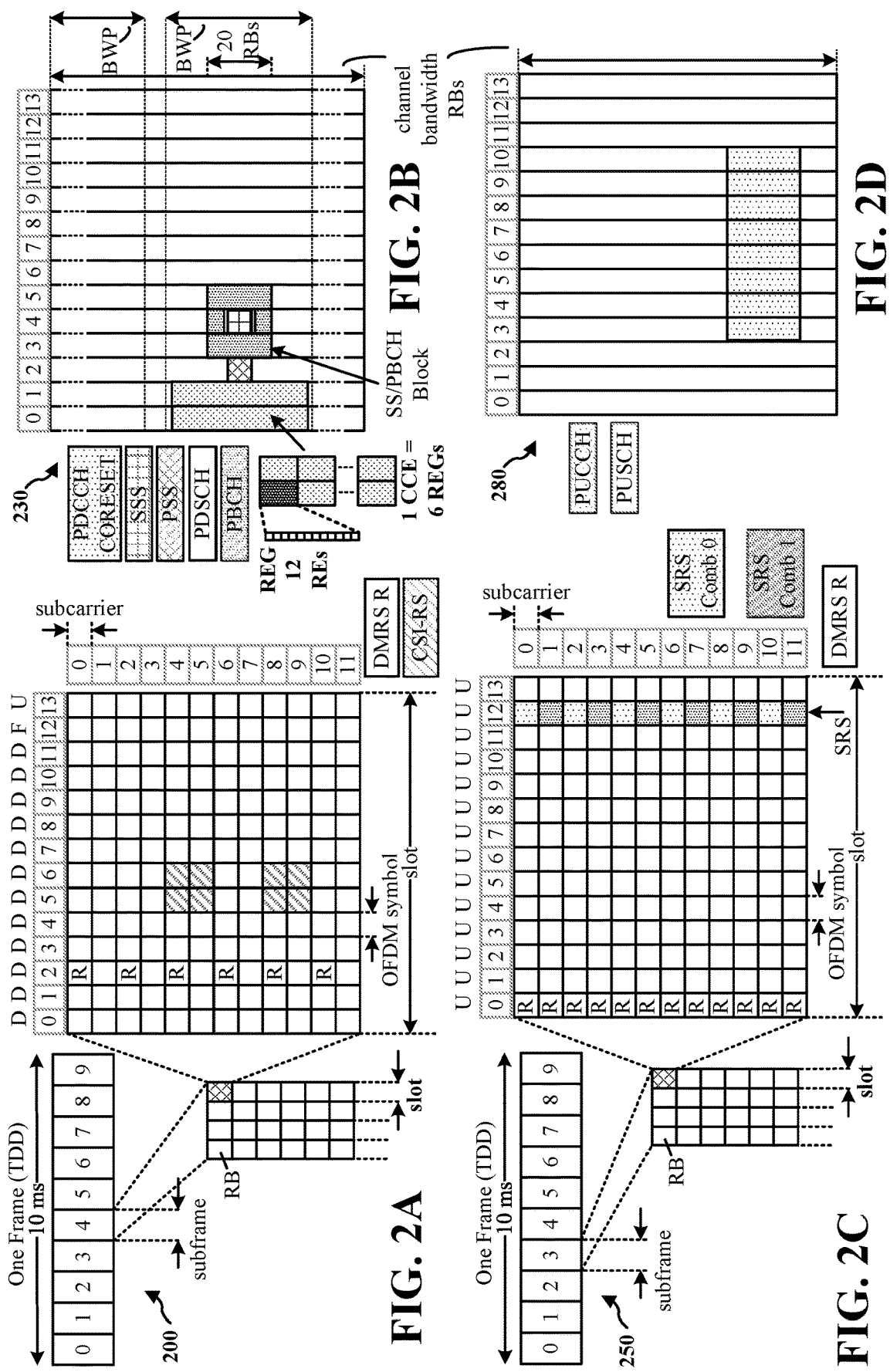
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios), discrete Fourier transform (DFT) spread OFDM (DFT-s-OFDM) symbols, or single carrier frequency-division multiple access (SC-FDMA) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
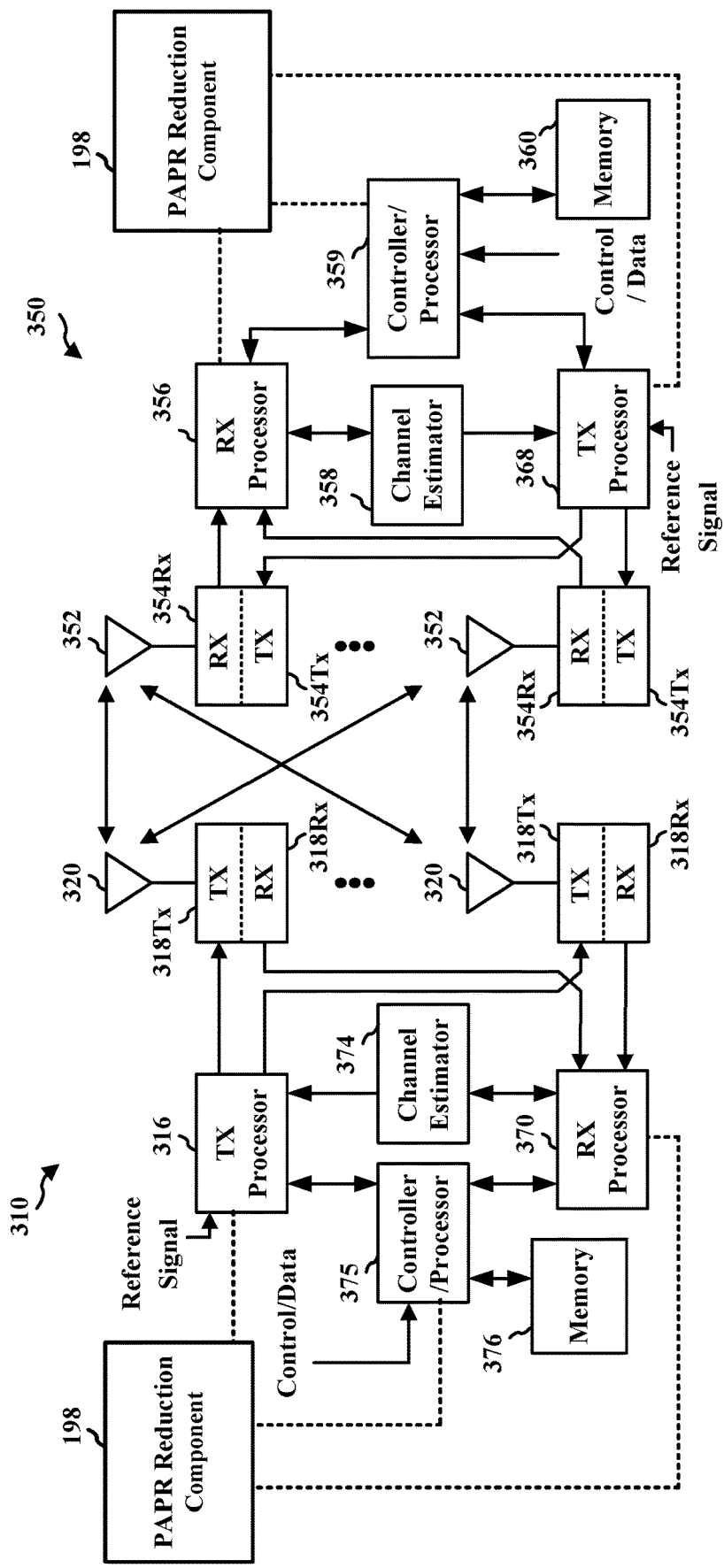
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PAPR reduction component 198 of FIG. 1.

At least one of the TX processor 316, the RX processor 370, and the controller/processor 375 may be configured to perform aspects in connection with the PAPR reduction component 198 of FIG. 1.

In some aspects of wireless communication, a non-linearity of a power amplifier (PA) at a transmitting device may result in distortions of signals and increased error vector magnitude (EVM) at a receiving device. The non-linearity may be experienced at higher powers, e.g., past a saturation point. In order to maintain linearity of the PA, a transmitter may employ a backoff that sacrifices total power to reduce distortion to the signal. When transmitting a waveform associated with a higher PAPR, a transmitting device may use a larger backoff to maintain linearity of the PA. In order to increase total power for a particular waveform, a method may be employed to reduce the PAPR associated with the particular waveform to allow for a smaller backoff. In some aspects, clipping and filtering (CF), tone reservation (TR), or spectrum extension may be used to reduce PAPR.

A method and apparatus are described to provide PAPR reduction for DFT-s-OFDM by introducing constraints on, or a relationship between, the phase transition between two consecutive modulation symbols. Generally, PAPR may be larger when phase transitions between consecutive modulation symbols are larger (e.g., have a greater magnitude) and conversely PAPR may be smaller when phase transitions between consecutive modulation symbols are smaller (e.g., have a smaller and/or zero magnitude). By staying within the phase transition constraint between consecutive modulation symbols, as presented herein, the PAPR of the signal can be reduced and/or constrained with less distortion than CF. The PAPR may be reduced without an increase in complexity to compute the signal to be added in configured tone (e.g., iterative processing) as in TR. The PAPR may be reduced without increasing the frequency band, as in spectrum extension. The method and apparatus may provide a set of modulation symbols for which transitions between consecutive symbols follows a known, or configured, distribution. By constraining the phase transitions for consecutive modulation symbols to have the known, or configured, distribution of phase transitions a corresponding PAPR (or maximum PAPR) may be enforced. The method and apparatus may also be associated with new signaling to indicate the known, or configured, distribution of transitions between consecutive symbols. In some aspects, the method and apparatus are associated with a distribution matching function and/or component that implements and/or enforces the known, or configured, distribution after a set of bits is encoded and before a modulation operation. The placement of the distribution matching function and/or component after the encoding, in some aspects, allows for a distribution matching algorithm independent from, or transparent to, the channel encoder.

Figure 4:
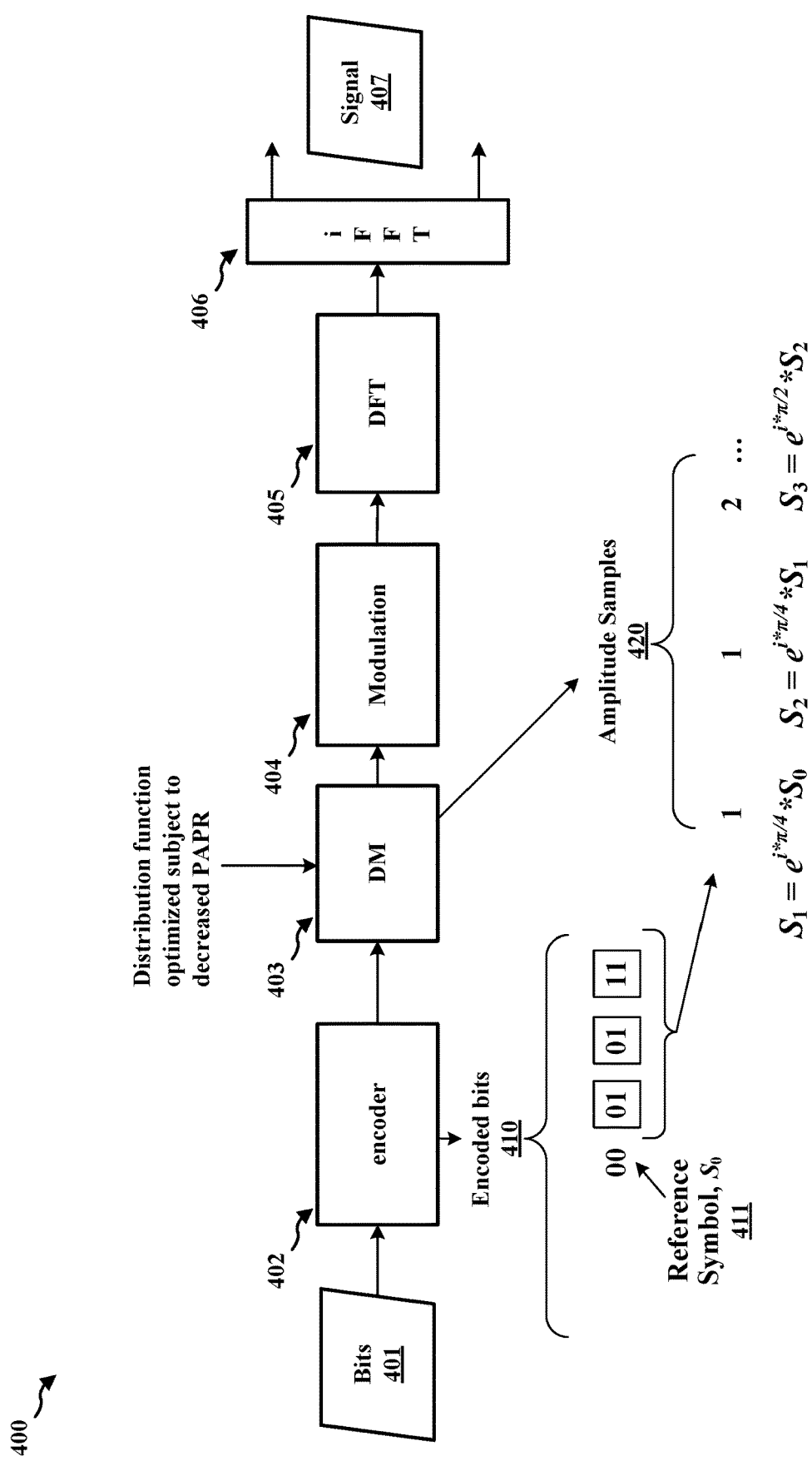
FIG. 4 is a diagram illustrating a processing pipeline of a transmission device in accordance with some aspects of the disclosure.

FIG. 4 is a diagram 400 illustrating a processing pipeline of a transmission device (e.g., a wireless device such as a UE, a base station, or a network node) in accordance with some aspects of the disclosure. The processing pipeline may be applied to a set of bits 401 to produce a transmitted signal 407. The set of bits 401, in some aspects, may be a code block bit sequence. The processing pipeline may include an encoder 402 (e.g., an LDPC encoder or polar encoder) that, in some aspects, may include rate matching. The encoder 402 may produce a set of encoded bits 410 including a reference symbol 411 and that may include sets of bits that are mapped to QPSK symbols (e.g., two bits mapped to each symbol).

Figure 5:
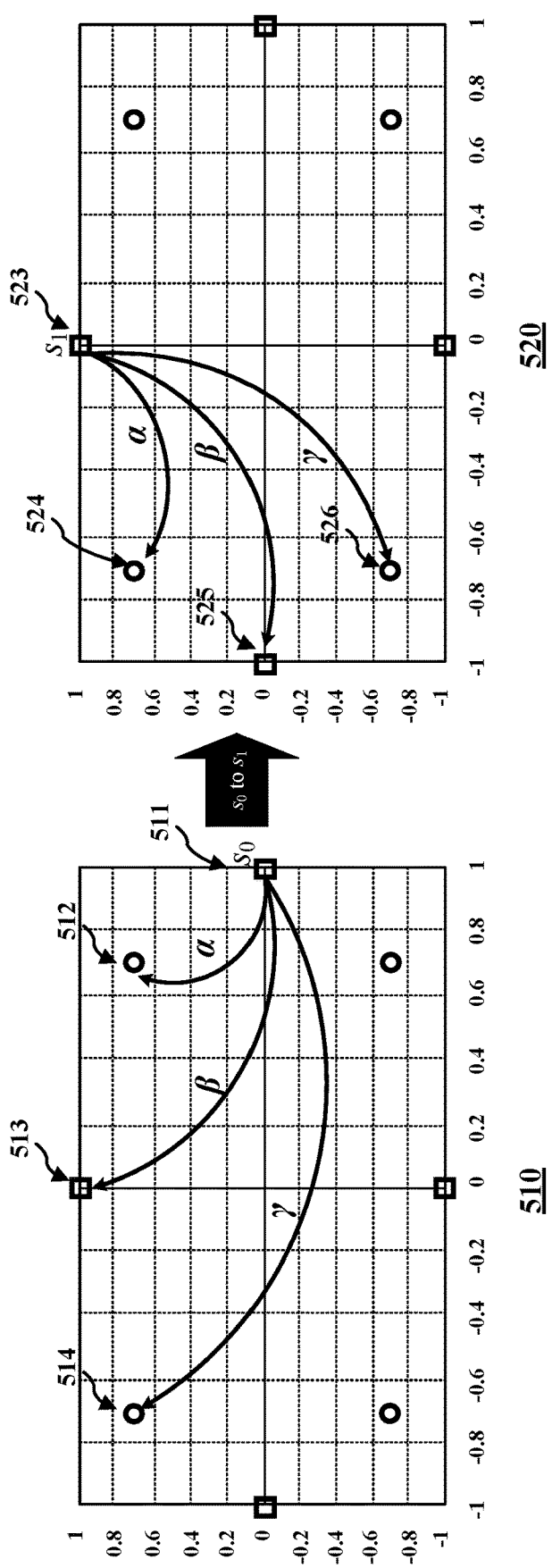
FIG. 5 is a set of diagrams illustrating a set of transitions between symbols.

After the encoding, the processing pipeline may include a distribution matching function 403. The distribution matching function 403, in some aspects, may enforce a known, or configured distribution of phase transitions between consecutive modulation symbols. For example, a distribution of phase transitions may assign probabilities [α, β, γ] for phase transitions of [π/4, π/2, 3π/4], where α+β+γ=1. FIG. 5 is a set of diagrams 510 and 520 illustrating a set of transitions between symbols (e.g., possible states of a pi/4 QPSK constellation). Diagram 510 illustrates that for a first symbol 511 (e.g., a reference symbol, $s_0$) there is a set of probabilities α, β, and γ for transitioning to a symbol (e.g., a state in the pi/4 QPSK constellation) 512, 513, and 514, respectively. Similarly, diagram 520 illustrates that if the first transition is from the first symbol 511 to 513, there may be a same set of probabilities α, β, and γ for transitioning from a second symbol 523 (e.g., a symbol, $s_1$, after the reference symbol, $s_0$) to a symbol (e.g., a state in the pi/4 QPSK constellation) 524, 525, and 526, respectively. The configuration of the probability distribution, in some aspects, may be more or less aggressive (e.g., may assign higher or lower probabilities to transitions with smaller phase change). The distribution matching function 403, in some aspects, may be placed after the encoder 402 to avoid additional complexity associated with rate matching and other considerations associated with distribution matching before encoding at the encoder 402. By constraining the phase transitions for consecutive modulation symbols to have a configured distribution of phase transitions a corresponding PAPR (or maximum PAPR) may be enforced.

The distribution matching function 403, in some aspects, may perform a mapping from the set of encoded bits 410 to a set of amplitude samples 420 that indicate a phase shift from a last symbol (e.g., an amplitude of "1" indicates a phase snit $$\frac{\pi}{4},$$

an amplitude of "2" indicates a phase shift of $$\frac{\pi}{2},$$

and an amplitude of "3" indicates a phase shift of $$\frac{3\pi}{4}).$$

In some aspects, a reference symbol is provided to a receiving device along with the indicated phase shift to allow a receiving device to identify a phase shift from which the subsequent phase shifts begin. The mapping may be implemented based on a look up table (LUT) or a mapping algorithm. Accordingly, each set of encoded bits 410, in some aspects, may be mapped to a specific set of output symbols that satisfies the distribution of amplitudes and/or phase shift values for consecutive symbols (e.g., there is a 1-to-1 mapping from a set of encoded bits to a set of output symbols). For example, in order to enforce the known, or configured, probability distribution, the 1-to-1 mapping, in some aspects, may map a complete set of encoded bits to a corresponding set of symbols (or amplitude samples). The set of output symbols satisfying the distribution of amplitudes and/or phase shift values may include a larger number of symbols than necessary to carry the encoded bits. For example, the information carried by 32 bits may be able to be encoded in 16 symbols (e.g., with each symbol corresponding to 2 encoded bits), but in order to use sets of symbols conforming to the known, or configured, distribution of amplitudes and/or phase shift values, the sets of symbols may include a larger number of symbols, e.g., 32 symbols, such that only a subset of the possible sets of symbols are used for the mapping.

In some aspects, a 'rate', e.g., a number of input encoded bits (output of 402) divided by a number of output modulated symbols (output of 404) multiplied by a modulation order or a number of input bits per output symbol of the distribution matching function 403 may decrease as the probability distribution becomes more aggressive (e.g., assigns higher probability to smaller amplitude transitions). In some aspects, the reduction in the rate associated with the distribution matching function 403 may reflect a reduced number of candidate symbol sequences that satisfy the probability distribution such that additional symbols may be used to provide a set of symbols that can be mapped 1-to-1 to a set of input (encoded) bits.

After the distribution matching function 403, the processing pipeline may include a modulation function 404. The modulation function 404 may generate a set of modulation symbols. The phase of the symbols in the set of modulation symbols may be derived from the generated amplitude samples 420 and the reference symbol 411 (and additional reference symbols if configured). The set of modulation symbols may subsequently be processed by a DFT function 405 and an iFFT function 406 in the processing pipeline. As indicated, the processing pipeline may produce a signal 407 for transmission by the transmitting device.

Figure 6:
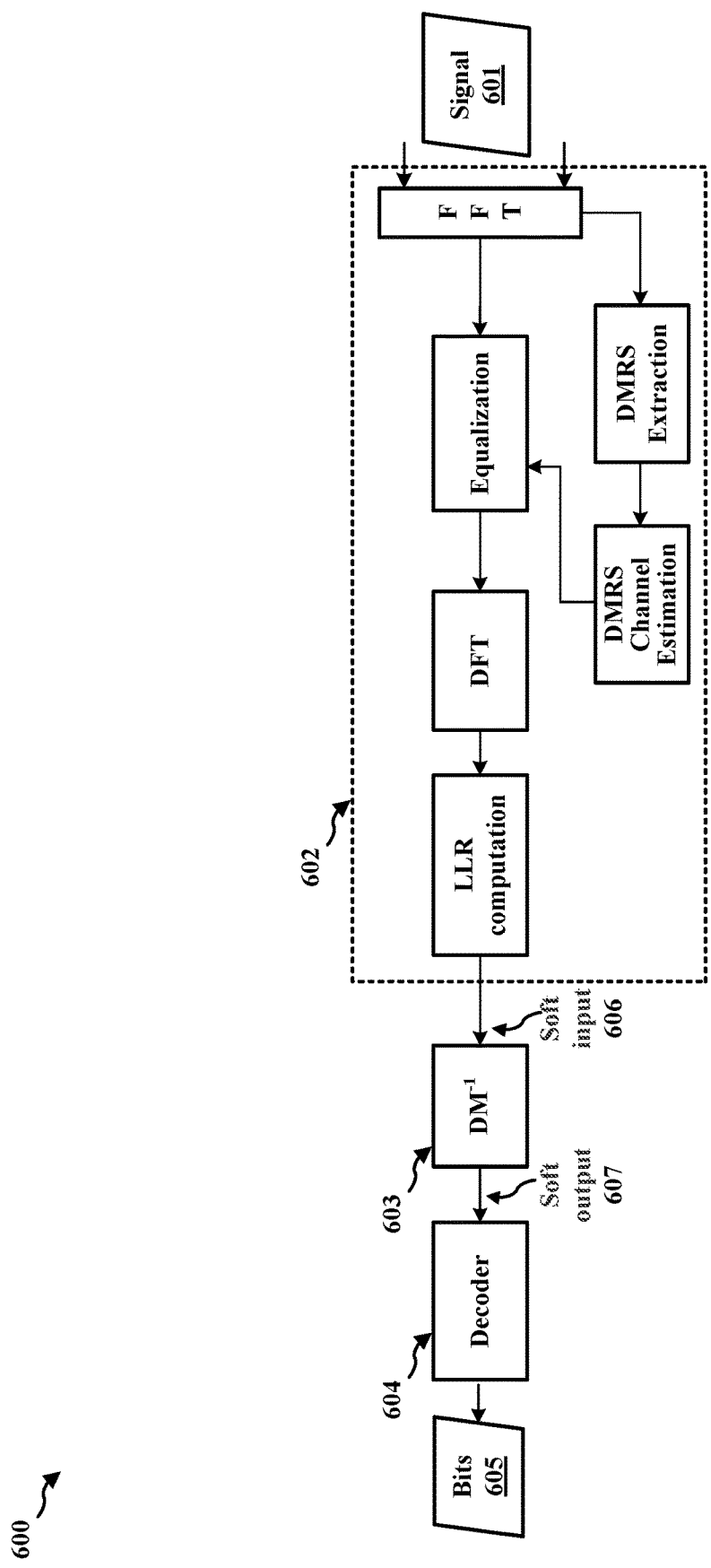
FIG. 6 is a diagram illustrating a processing pipeline of a receiving device in accordance with some aspects of the disclosure.

FIG. 6 is a diagram 600 illustrating a processing pipeline of a receiving device (e.g., a wireless device such as a UE, a base station, or a network node) in accordance with some aspects of the disclosure. The processing pipeline may be applied to a signal 601 to produce a set of (decoded) bits 605. The processing pipeline may begin with a first group of operations and/or components 602 (e.g., an FFT function, an equalization function, a DMRS extraction function, a DMRS channel estimation function, a DFT function, and a log likelihood ratio (LLR) computation function) that produce a 'soft input' 606 (e.g., a set of soft bits) for an inverse distribution matching function 603.

The inverse distribution matching function 603, may be configured with, or provided information regarding, a probability distribution, a distribution matching algorithm, and/or a LUT used by a distribution matching function of a transmitting device (e.g., the distribution matching function 403 of the transmitting device of FIG. 4). Based on the probability distribution, the probability distribution, the distribution matching algorithm, and/or the LUT, and the soft input 606, the inverse distribution matching function may produce a set of soft encoded bits 607 for processing by a decoder 604 (e.g., an LDPC decoder or polar decoder). The decoder 604 may produce a set of decoded bits 605. In some aspects, the set of decoded bits 605 may be equivalent to the set of encoded bits 401.

Figure 7:
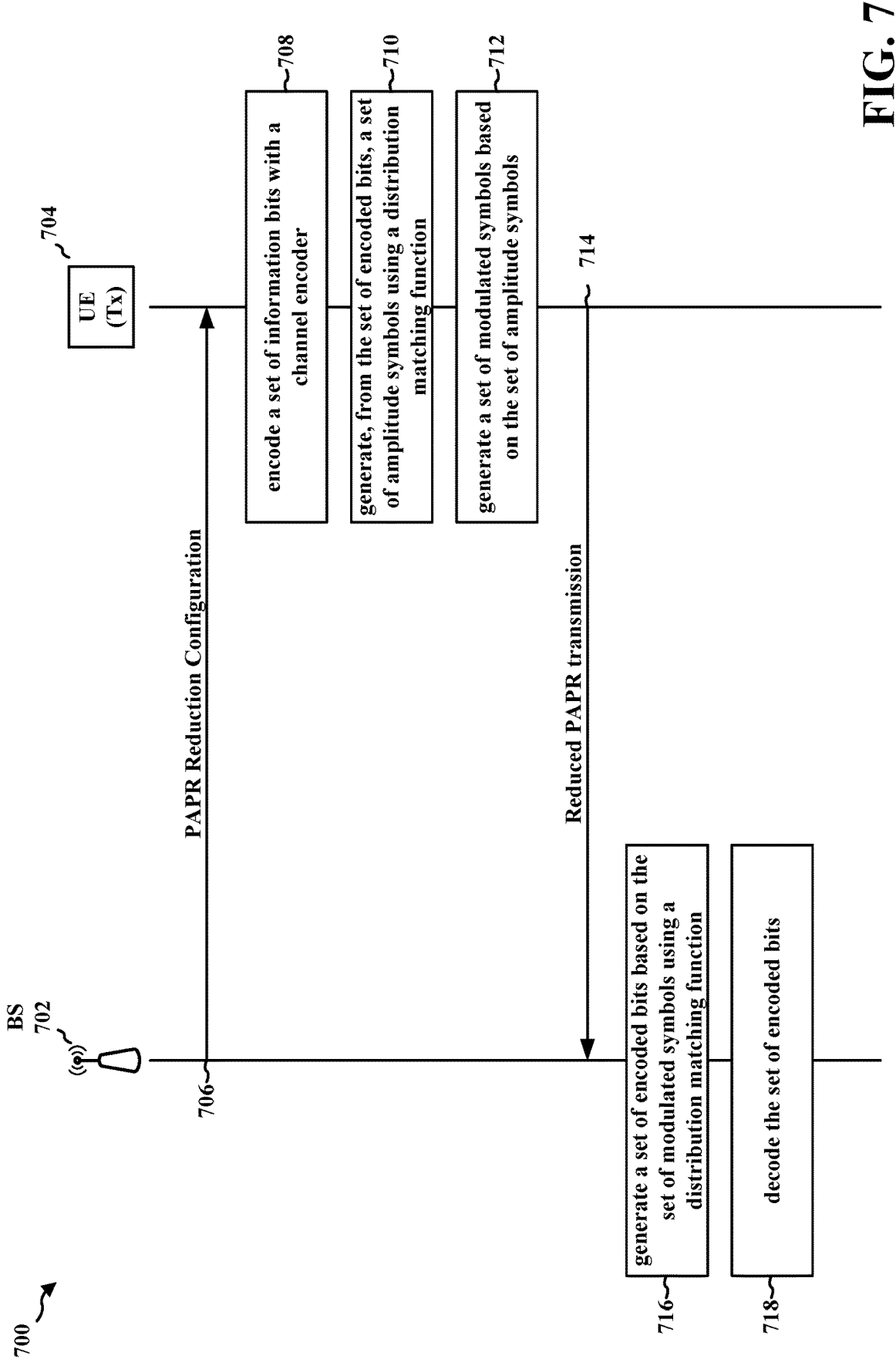
FIG. 7 is a call flow diagram illustrating wireless communication in accordance with some aspects of the invention.

FIG. 7 is a call flow diagram 700 illustrating wireless communication in accordance with some aspects of the invention. Call flow diagram 700 illustrates an example of a base station 702 in communication with a UE 704, however, the example does not limit the implementation to any particular type of device for wireless communication and may be used for communication between any of a wireless device, UE, network node, network entity, base station, of base station component. The base station 702 may transmit, and UE 704 may receive, a PAPR reduction configuration 706. The PAPR reduction configuration 706, in some aspects, may include information regarding a probability distribution associated with distribution matching function used to generate reduced PAPR transmitted signals at UE 704. The probability distribution may indicate a set of probabilities for a corresponding set of transitions between states for consecutive symbols in a transmitted signal as discussed in relation FIGS. 4 and 5 above. The PAPR reduction configuration 706, in some aspects, may include information relating to a distribution matching algorithm, a LUT used to perform the distribution matching (e.g., to enforce the probability distribution) and/or a set of reference symbol locations and/or values. PAPR reduction configuration 706, in some aspects, may be transmitted in an information element indicating one or more of the probability distribution, the distribution matching algorithm, and/or the LUT.

Based on the PAPR reduction configuration 706, the UE 704 may begin processing a set of information bits for transmission. Similarly, to the processing pipeline discussed in relation to FIG. 4, the UE 704 may, at 708, encode a set of information bits (e.g., bits 401) using a channel encoder (e.g., encoder 402) to produce a set of encoded bits (e.g., encoded bits 410). Based on the set of bits encoded at 708, the UE 704 may generate a set of amplitude symbols (or samples) using a distribution matching function at 710.

The generation of the amplitude symbols at 710 may be based on the whole set of encoded bits (as opposed to a bit-by-bit, or bit-group by bit-group, mapping). For example, given a whole set of encoded (information) bits, the UE 704 may perform a distribution matching function that maps the whole set of encoded bits to a corresponding set of amplitude symbols. The amplitude symbols and/or samples, in some aspects, indicate (or correspond to) a magnitude of a phase transition from a phase of a reference symbol. As described above in relation to FIGS. 4 and 5, in some aspects, an amplitude symbol and/or sample of 1, 2, or 3 may indicate a phase shift of $$\frac{\pi}{4}, \frac{\pi}{2},$$

and $$\frac{3\pi}{4},$$

respectively. In some aspects, the amplitude symbols and/or samples may be based on a set of one or more reference symbols, e.g., a first symbol or a set of known symbols. The reference signals, in some aspects, may be spaced throughout the transmitted signal to improve accuracy and to prevent an incorrect amplitude symbol and/or sample from propagating for too long (e.g., for greater than a spacing of reference symbols).

Based on the amplitude symbols and/or samples and the reference symbol generated at 710, the UE 704 may generate a set of modulated symbols at 712. The modulated symbols in some aspects, may be associated with a QAM or PSK modulation (e.g., pi/4 QPSK modulation). The generated modulated symbols may undergo additional processing as described in relation to FIG. 4 above. After any additional processing, the UE 704 may transmit, and base station 702 may receive, a reduced PAPR transmission 714 that is based on the generated modulated symbols.

The base station 702 may then generate at 716 a set of encoded bits based on the reduced PAPR transmission 714, e.g., based on the set of modulated symbols generated at 712. For example, referring to FIG. 6, the base station 702 may receive signal 601 and process the received signal 601 through the first group of operations and/or components 602 to generate a soft input 606 for the inverse distribution matching function 603. The soft input 606 may then be processed by the inverse distribution matching function 603 to generate the set of soft encoded bits 607. The inverse distribution matching function 603 may be configured based on the same information indicated in PAPR reduction configuration 706.

After generating the set of encoded bits (e.g., a set of soft bits or a soft output) at 716, the base station 702 may decode the set of encoded bits to generate a set of information bits. For example, referring to FIG. 6, the set of soft encoded bits 607 of the inverse distribution matching function 603 may be processed by the decoder 604 to generate the decoded and/or information bits 605.

Figure 8:
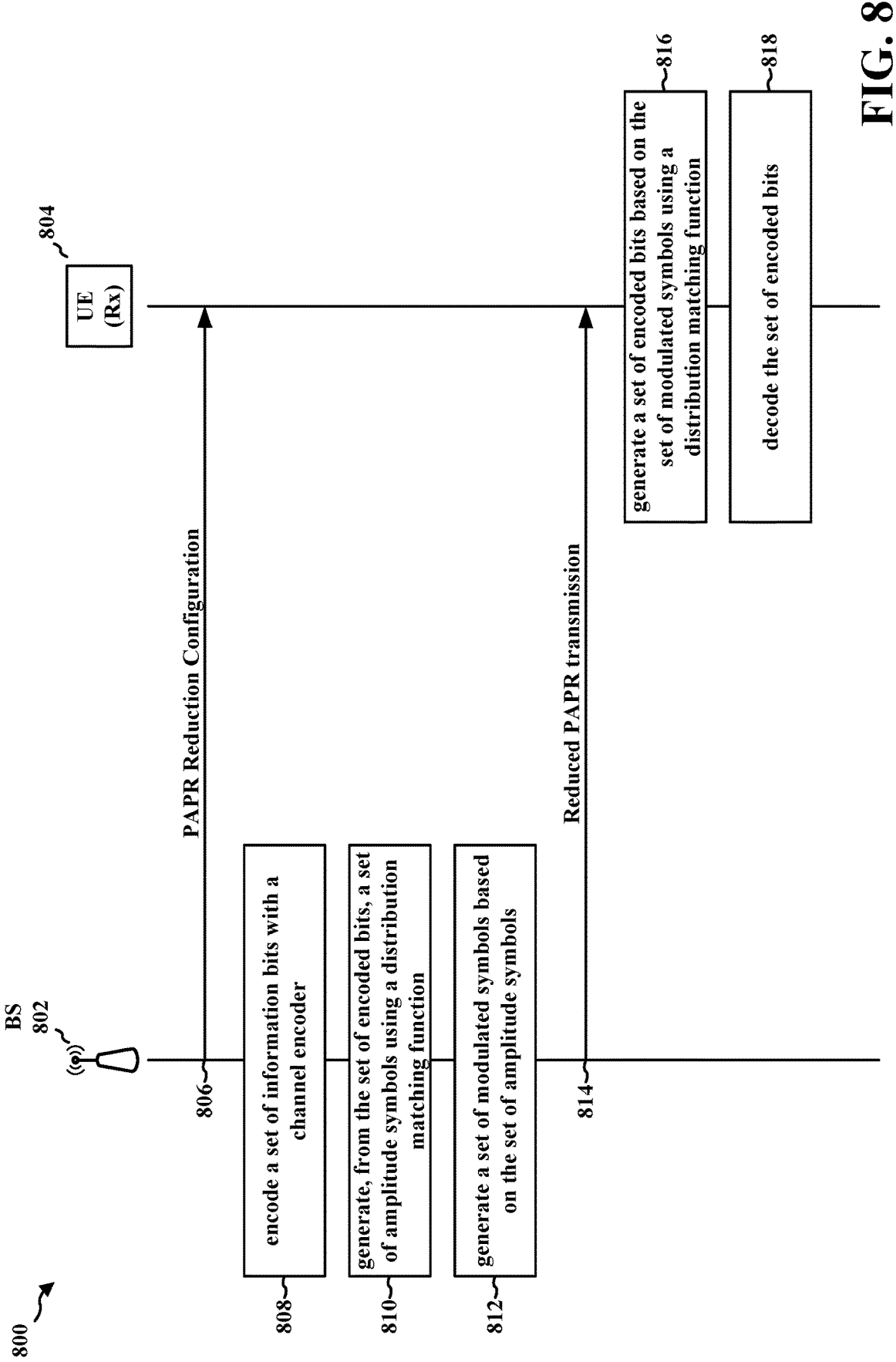
FIG. 8 is a call flow diagram illustrating wireless communication in accordance with some aspects of the invention.

FIG. 8 is a call flow diagram 800 illustrating wireless communication in accordance with some aspects of the invention. Call flow diagram 800 illustrates an example of a base station 802 in communication with a UE 804, however, the example does not limit the implementation to any particular type of device for wireless communication and may be used for communication between any of a wireless device, UE, network node, network entity, base station, of base station component. The base station 802 may transmit, and UE 804 may receive, a PAPR reduction configuration 806. The PAPR reduction configuration 806, in some aspects, may include information regarding a probability distribution associated with distribution matching function used to generate reduced PAPR transmitted signals at base station 802. The probability distribution may indicate a set of probabilities for a corresponding set of transitions between states for consecutive symbols in a transmitted signal as discussed in relation FIGS. 4 and 5 above. The PAPR reduction configuration 806, in some aspects, may include information relating to a distribution matching algorithm, a LUT used to perform the distribution matching (e.g., to enforce the probability distribution) and/or a set of reference symbol locations and/or values. The reference symbol corresponds to a symbol that is known at the receiver and transmitter. PAPR reduction configuration 806, in some aspects, may be transmitted in an information element indicating one or more of the probability distribution, the distribution matching algorithm, and/or the LUT.

Based on the PAPR reduction configuration 806, the base station 802 may begin processing a set of information bits for transmission. Similarly, to the processing pipeline discussed in relation to FIG. 4, the base station 802 may, at 808, encode a set of information bits (e.g., bits 401) using a channel encoder (e.g., encoder 402) to produce a set of encoded bits (e.g., encoded bits 410). Based on the set of bits encoded at 808, the base station 802 may generate a set of amplitude symbols (or samples) using a distribution matching function at 810.

The generation of the amplitude symbols at 810 may be based on the whole set of encoded bits (as opposed to a bit-by-bit, or bit-group by bit-group, mapping). For example, given a whole set of encoded (information) bits, the base station 802 may perform a distribution matching function that maps the whole set of encoded bits to a corresponding set of amplitude symbols. The amplitude symbols and/or samples, in some aspects, indicate (or correspond to) a magnitude of a phase transition from a phase of a reference symbol. As described above in relation to FIGS. 4 and 5, in some aspects, an amplitude symbol and/or sample of 1, 2, or 3 may indicate a phase shift of $$\frac{\pi}{4}, \frac{\pi}{2},$$

and $$\frac{3\pi}{4},$$

respectively. In some aspects, the amplitude symbols and/or samples may be based on a set of one or more reference symbols, e.g., a first symbol or a set of known symbols. The reference signals, in some aspects, may be spaced throughout the transmitted signal to improve accuracy and to prevent an incorrect amplitude symbol and/or sample from propagating for too long (e.g., for greater than a spacing of reference symbols).

Based on the amplitude symbols and/or samples and the reference symbol generated at 810, the base station 802 may generate a set of modulated symbols at 812. The modulated symbols in some aspects, may be associated with a QAM or PSK modulation (e.g., pi/4 QPSK modulation). The generated modulated symbols may undergo additional processing as described in relation to FIG. 4 above. After any additional processing, the base station 802 may transmit, and UE 804 may receive, a reduced PAPR transmission 814 that is based on the generated modulated symbols.

The UE 804 may then generate at 816 a set of encoded bits based on the reduced PAPR transmission 814, e.g., based on the set of modulated symbols generated at 812. For example, referring to FIG. 6, the UE 804 may receive signal 601 and process the received signal 601 through the first group of operations and/or components 602 to generate a soft input 606 for the inverse distribution matching function 603. The soft input 606 may then be processed by the inverse distribution matching function 603 to generate the set of encoded bits. The inverse distribution matching function 603 may be configured based on the same information indicated in PAPR reduction configuration 806.

After generating the set of encoded bits (e.g., a set of soft bits or a soft output) at 816, the UE 804 may decode the set of encoded bits to generate a set of information bits at 818. For example, referring to FIG. 6, the set of soft encoded bits 607 of the inverse distribution matching function 603 may be processed by the decoder 604 to generate the decoded and/or information bits 605.

Figure 9:
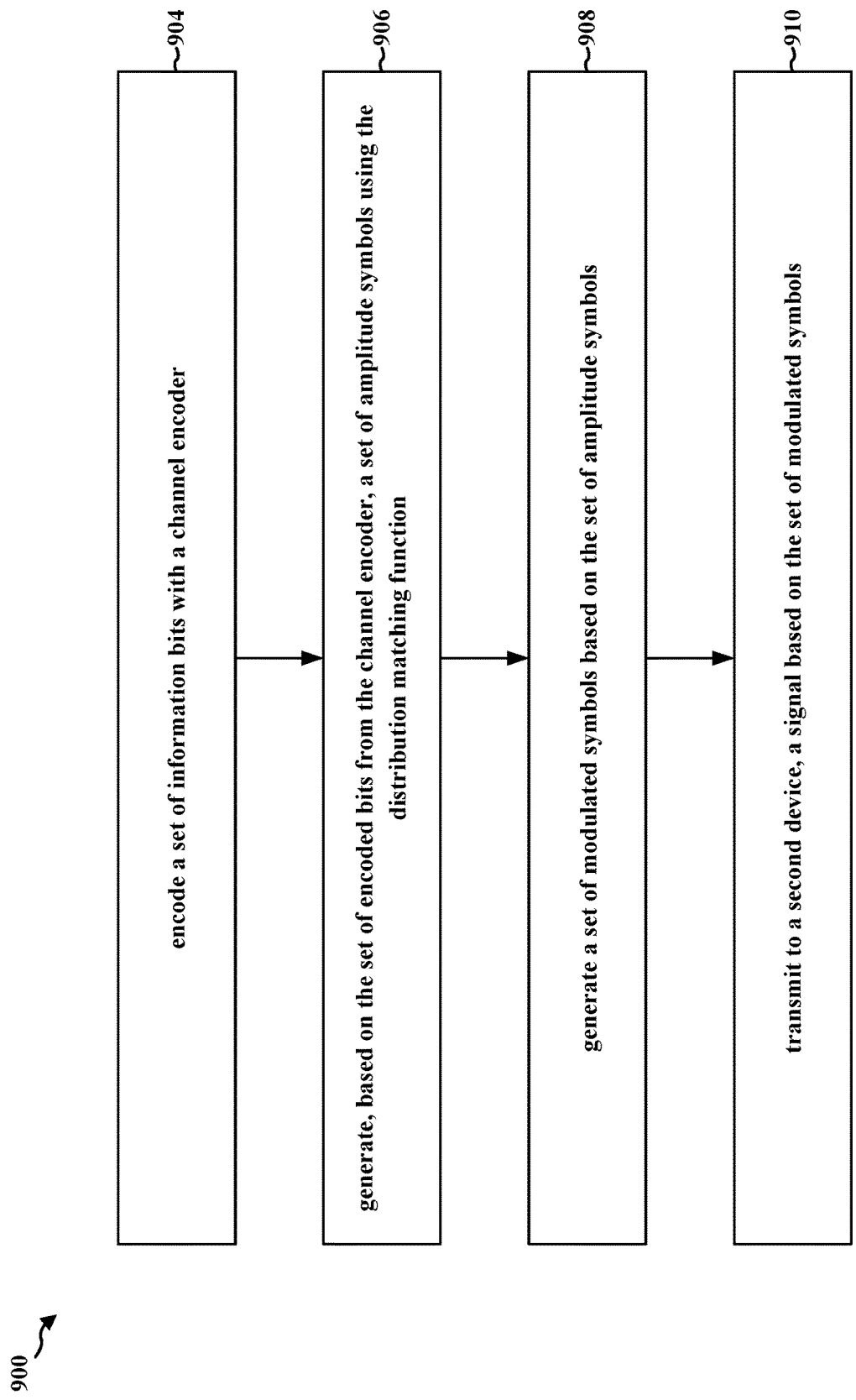
FIG. 9 is a flowchart of a method of wireless communication.

FIG. 9 is a flowchart 900 of a method of wireless communication. The method may be performed by a UE (e.g., the UE 104, 704, or 804; the apparatus 1304), a base station (e.g., the base station 102, 702, or 802; the network entity 1402), or other wireless communication device. For the description of flowchart 900, the method will be described as being performed by a UE to simplify the description. At 904, the UE may encode a set of information bits with a channel encoder. For example, 904 may be performed by application processor 1306, cellular baseband processor 1324, and/or PAPR reduction component 198 of FIG. 13 or CU processor 1412, DU processor 1432, RU processor 1442, network processor 1412, and/or PAPR reduction component 198 of FIG. 14. The channel encoder, in some aspects, may be an LDPC encoder and/or a polar encoder. Encoding the set of information bits, in some aspects, produces a set of encoded bits. For example, referring to FIGS. 4, 7, and 8, the UE 704 (or a base station 802) may encode a set of information bits at 708 (or at 808) to produce a set of encoded bits 410.

At 906, the UE may generate, based on the set of information bits encoded from the channel encoder, a set of amplitude symbols using the distribution matching function. For example, 906 may be performed by application processor 1306, cellular baseband processor 1324, and/or PAPR reduction component 198 of FIG. 13 or CU processor 1412, DU processor 1432, RU processor 1442, network processor 1412, and/or PAPR reduction component 198 of FIG. 14. In some aspects, the set of amplitude symbols indicates a set of phases that are used to generate the set of modulated symbols. The set of amplitude symbols, in some aspects, may indicate a magnitude of a phase shift between consecutive modulation symbols. The distribution matching function, in some aspects, may be associated with a probability distribution of different amplitudes that is used to reduce the PAPR of a transmitted signal. For example, referring to FIGS. 4, 7, and 8, the UE 704 (or a base station 802) may generate a set of amplitude symbols (or samples) using a distribution matching function at 710 (or at 810) to produce the set of amplitude samples 420.

In some aspects, the UE may transmit, or receive, an indication of the distribution matching function used to generate the set of amplitude symbols at 906. The indication of the distribution matching function, in some aspects, may be transmitted, or received, in an information element. The indication of the distribution matching function, in some aspects, may be transmitted, or received, via one or more of DCI and/or UCI, a MAC-CE, or RRC signaling individually or in combination, e.g., RRC signaling may be used to transmit, or receive, a set of candidate configurations that are activated by one or more of a MAC-CE or DCI and/or UCI. The indication of the distribution matching function, in some aspects, may include an indication of one or more of a probability distribution of phase transition magnitudes between states, a distribution matching algorithm, and/or a LUT. In some aspects, the UE may receive the indication of the distribution matching function from a network node. The UE, in some aspects, may transmit the indication of the distribution matching function to a second wireless communication device. For example, referring to FIGS. 7 and 8, the UE 704/804 may receive, and the base station 702/802 may transmit, the PAPR reduction configuration 706/806.

At 908, the UE may generate a set of modulated symbols based on the set of amplitude symbols. For example, 908 may be performed by application processor 1306, cellular baseband processor 1324, and/or PAPR reduction component 198 of FIG. 13 or CU processor 1412, DU processor 1432, RU processor 1442, network processor 1412, and/or PAPR reduction component 198 of FIG. 14. In some aspects, the set of modulated symbols may further be based on at least one reference symbol. The at least one reference symbol, in some aspects, may include a plurality of reference symbols associated with a set of known positions (and a corresponding set of known values for symbols at the set of known positions) in the set of modulated symbols. An indication of the set of known positions and the corresponding set of known values for the at least one reference symbol, in some aspects, may be included in the indication of the distribution matching function and/or may be transmitted by the network node (and received by the UE) as a separate indication via one or more of the DCI and/or UCI, a MAC-CE, or RRC signaling as described in relation to the indication of the distribution matching function. Each reference symbol may be used to define a set of subsequent symbols based on the amplitude symbols. The set of modulated symbols, in some aspects, may be associated with at least one of a QAM or PSK modulation (e.g., pi/4 QPSK modulation). For example, referring to FIGS. 4, 5, 7, and 8, the UE 704 (or a base station 802) may generate a set of modulated symbols at 712 (or at 812) based on a reference symbol and a transition as illustrated in diagrams 510 and 520.

Finally, at 910, the UE may transmit to a second device, a signal based on the set of modulated symbols. For example, 910 may be performed by application processor 1306, cellular baseband processor 1324, transceiver(s) 1322, antenna(s) 1380, and/or PAPR reduction component 198 of FIG. 13 or CU processor 1412, DU processor 1432, RU processor 1442, network processor 1412, transceiver(s) 1446, antennas 1480, and or PAPR reduction component 198 of FIG. 14. For example, referring to FIGS. 4, 7, and 8, the UE 704 (or a base station 802) may transmit a reduced PAPR transmission 714 (or 814) based on the set of modulated symbols (e.g., after further processing by the DFT function 405 and the iFFT function 406).

Figure 10:
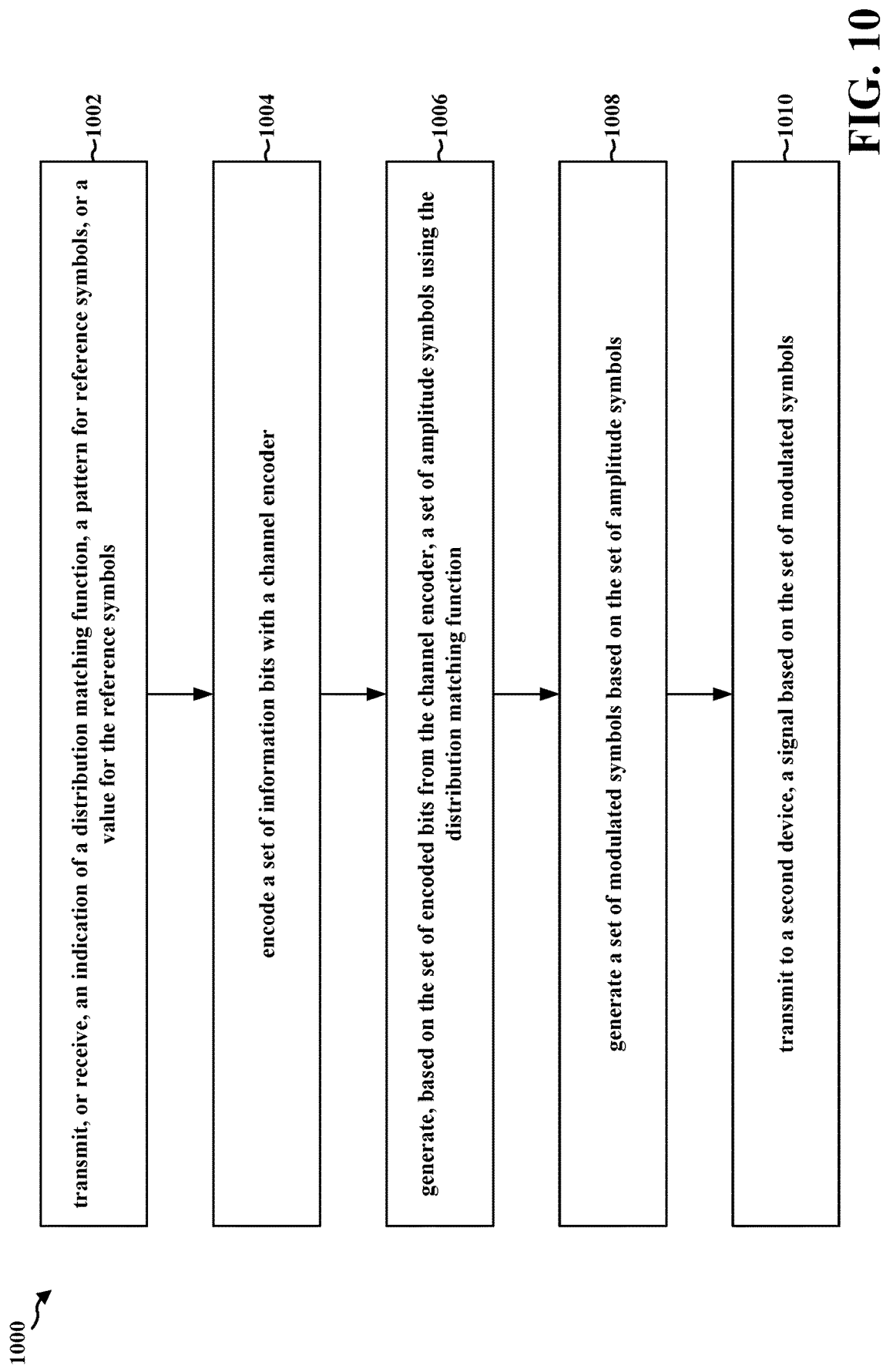
FIG. 10 is a flowchart of a method of wireless communication.

FIG. 10 is a flowchart 1000 of a method of wireless communication. The method may be performed by a UE (e.g., the UE 104, 704, or 804; the apparatus 1304), a base station (e.g., the base station 102, 702, or 802; the network entity 1402), or other wireless communication device. For the description of flowchart 1000, the method will be described as being performed by a UE to simplify the description. At 1002, the UE may transmit, or receive, an indication of a at least one of a distribution matching function, a pattern for reference symbols, or a value for the reference symbols. For example, 1002 may be performed by application processor 1306, cellular baseband processor 1324, transceiver(s) 1322, antenna(s) 1380, and/or PAPR reduction component 198 of FIG. 13 or CU processor 1412, DU processor 1432, RU processor 1442, network processor 1412, transceiver(s) 1446, antennas 1480, and or PAPR reduction component 198 of FIG. 14. The indication of the distribution matching function or reference symbol pattern or value, in some aspects, may be transmitted, or received, in an information element. The indication of the distribution matching function or reference symbol pattern or value, in some aspects, may be transmitted, or received, via one or more of DCI and/or UCI, a MAC-CE, or RRC signaling individually or in combination, e.g., RRC signaling may be used to transmit, or receive, a set of candidate configurations that are activated by one or more of a MAC-CE or DCI and/or UCI. The indication of the distribution matching function, in some aspects, may include an indication of one or more of a probability distribution of transitions between states, a distribution matching algorithm, and/or a LUT. In some aspects, the UE may receive the indication of the distribution matching function from a network node. The UE, in some aspects, may transmit the indication of the distribution matching function to a second wireless communication device. For example, referring to FIGS. 7 and 8, the UE 704/804 may receive, and the base station 702/802 may transmit, the PAPR reduction configuration 706/806.

At 1004, the UE may encode a set of information bits with a channel encoder. For example, 1004 may be performed by application processor 1306, cellular baseband processor 1324, and/or PAPR reduction component 198 of FIG. 13 or CU processor 1412, DU processor 1432, RU processor 1442, network processor 1412, and/or PAPR reduction component 198 of FIG. 14. The channel encoder, in some aspects, may be an LDPC encoder and/or a polar encoder. Encoding the set of information bits, in some aspects, produces a set of encoded bits. For example, referring to FIGS. 4, 7, and 8, the UE 704 (or a base station 802) may encode a set of information bits at 708 (or at 808) to produce a set of encoded bits 410.

At 1006, the UE may generate, based on the set of information bits encoded from the channel encoder, a set of amplitude symbols using the distribution matching function. For example, 1006 may be performed by application processor 1306, cellular baseband processor 1324, and/or PAPR reduction component 198 of FIG. 13 or CU processor 1412, DU processor 1432, RU processor 1442, network processor 1412, and/or PAPR reduction component 198 of FIG. 14. In some aspects, the set of amplitude symbols indicates a set of phases that are used to generate the set of modulated symbols. The set of amplitude symbols, in some aspects, may indicate a magnitude of a phase shift between consecutive modulation symbols. The distribution matching function, in some aspects, may be associated with a probability distribution of different amplitudes that is used to reduce the PAPR of a transmitted signal. For example, referring to FIGS. 4, 7, and 8, the UE 704 (or a base station 802) may generate a set of amplitude symbols (or samples) using a distribution matching function at 710 (or at 810) to produce the set of amplitude samples 420.

At 1008, the UE may generate a set of modulated symbols based on the set of amplitude symbols. For example, 1008 may be performed by application processor 1306, cellular baseband processor 1324, and/or PAPR reduction component 198 of FIG. 13 or CU processor 1412, DU processor 1432, RU processor 1442, network processor 1412, and/or PAPR reduction component 198 of FIG. 14. In some aspects, the set of modulated symbols may further be based on at least one reference symbol. The at least one reference symbol, in some aspects, may include a plurality of reference symbols associated with a set of known positions (and a corresponding set of known values for symbols at the set of known positions) in the set of modulated symbols. An indication of the set of known positions and the corresponding set of known values for the at least one reference symbol, in some aspects, may be included in the indication of the distribution matching function received at 1002 and/or may be transmitted by the network node (and received by the UE) as a separate indication via one or more of the DCI and/or UCI, a MAC-CE, or RRC signaling as described in relation to the indication of the distribution matching function. Each reference symbol may be used to define a set of subsequent symbols based on the amplitude symbols. The set of modulated symbols, in some aspects, may be associated with at least one of a QAM or PSK modulation (e.g., pi/4 QPSK modulation). For example, referring to FIGS. 4, 5, 7, and 8,
the UE 704 (or a base station 802) may generate a set of modulated symbols at 712 (or at 812) based on a reference symbol and a transition as illustrated in diagrams 510 and 520.

Finally, at 1010, the UE may transmit to a second device, a signal based on the set of modulated symbols. For example, 1010 may be performed by application processor 1306, cellular baseband processor 1324, transceiver(s) 1322, antenna(s) 1380, and/or PAPR reduction component 198 of FIG. 13 or CU processor 1412, DU processor 1432, RU processor 1442, network processor 1412, transceiver(s) 1446, antennas 1480, and/or PAPR reduction component 198 of FIG. 14. For example, referring to FIGS. 4, 7, and 8, the UE 704 (or a base station 802) may transmit a reduced PAPR transmission 714 (or 814) based on the set of modulated symbols (e.g., after further processing by the DFT function 405 and the iFFT function 406).

Figure 11:
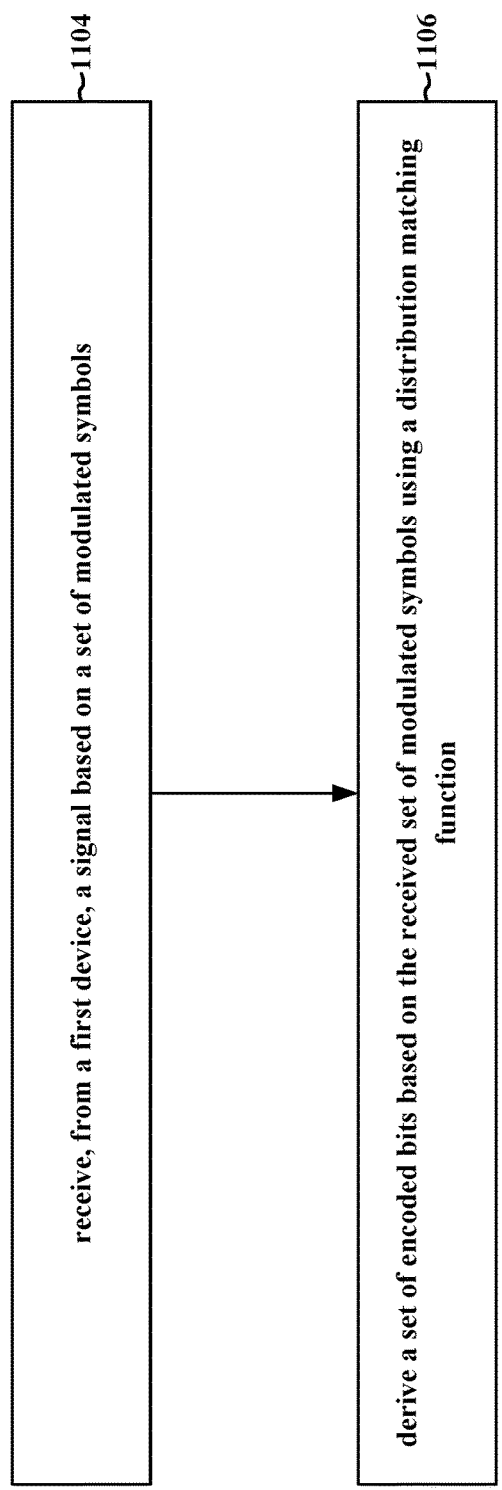
FIG. 11 is a flowchart of a method of wireless communication.

FIG. 11 is a flowchart 1100 of a method of wireless communication. The method may be performed by a base station (e.g., the base station 102, 702, or 802; the network entity 1402), a UE (e.g., the UE 104, 704, or 804; the apparatus 1304), or other wireless communication device. For the description of flowchart 1100, the method will be described as being performed by a base station to simplify the description. At 1104, the base station may receive a signal based on a set of modulated symbols. For example, 1104 may be performed by application processor 1306, cellular baseband processor 1324, transceiver(s) 1322, antenna(s) 1380, and/or PAPR reduction component 198 of FIG. 13 or CU processor 1412, DU processor 1432, RU processor 1442, network processor 1412, transceiver(s) 1446, antennas 1480, and or PAPR reduction component 198 of FIG. 14. In some aspects, the set of modulated symbols may further be based on at least one reference symbol. The at least one reference symbol, in some aspects, may include a plurality of reference symbols associated with a set of known positions (and a corresponding set of known values for symbols at the set of known positions) in the set of modulated symbols. An indication of the set of known positions and the corresponding set of known values for the at least one reference symbol, in some aspects, may be included in an indication of the distribution matching function and/or may be transmitted by the network node (and received by the UE) as a separate indication via one or more of the DCI and/or UCI, a MAC-CE, or RRC signaling as described in relation to the indication of the distribution matching function. Each reference symbol may be used to define a set of subsequent symbols based on the amplitude symbols. The set of modulated symbols, in some aspects, may be associated with at least one of a QAM or PSK modulation (e.g., pi/4 QPSK modulation). For example, referring to FIGS. 6-8, the base station 702 (or a UE 804) may receive the reduced PAPR transmission 714 (or 814) corresponding to signal 601.

Finally, at 1106, the base station may derive a set of encoded bits based on the received set of modulated symbols using a distribution matching function. For example, 1106 may be performed by application processor 1306, cellular baseband processor 1324, and/or PAPR reduction component 198 of FIG. 13 or CU processor 1412, DU processor 1432, RU processor 1442, network processor 1412, and or PAPR reduction component 198 of FIG. 14. Deriving the set of encoded bits, in some aspects, may include a set of operations in a processing pipeline such as a FFT function, an equalization function, a DFT function, and an LLR computation function used to generate a soft input 606 that may be used to derive the set of encoded bits using the distribution matching function. Based on the distribution matching function (e.g., indicated at 1102) the base station may generate an inverse distribution matching function to map the modulated symbols received at 1104 to a set of values for the encoded bits (the expected values for the encoded bits at the transmitting device). The set of encoded bits (or set of values for the encoded bits) may be a set of soft bits to be decoded by a decoder (e.g., a subsequent decoding step). For example, referring to FIGS. 6-8, the base station 702 (or a UE 804) may derive at 716 (or at 816) a set of encoded bits based on the reduced PAPR transmission 714 (or 814) corresponding to signal 601, e.g., based on the set of modulated symbols generated at 712 (or at 812). Deriving the encoded bits at 716 (or at 816), in some aspects, may include processing signal 601 through the first group of operations and/or components 602 to produce the soft input 606 and then applying the inverse distribution matching function 603 to produce the set of soft encoded bits 607 for processing by decoder 604 to produce bits 605.

An indication of the distribution matching function used at 1106, in some aspects, may be transmitted, or received, by the base station. The indication of the distribution matching function, in some aspects, may be transmitted, or received, in an information element. The indication of the distribution matching function, in some aspects, may be transmitted, or received, via one or more of DCI and/or UCI, a MAC-CE, or RRC signaling individually or in combination, e.g., RRC signaling may be used to transmit, or receive, a set of candidate configurations that are activated by one or more of a MAC-CE or DCI and/or UCI. The indication of the distribution matching function, in some aspects, may include an indication of one or more of a probability distribution of transitions between states, a distribution matching algorithm, and/or a LUT. In some aspects, the base station may receive the indication of the distribution matching function from a network node. The base station, in some aspects, may transmit the indication of the distribution matching function to a second wireless communication device. For example, referring to FIGS. 7 and 8, the base station 702/802 may transmit, and the UE 704/804 may receive, the PAPR reduction configuration 706/806.

Figure 12:
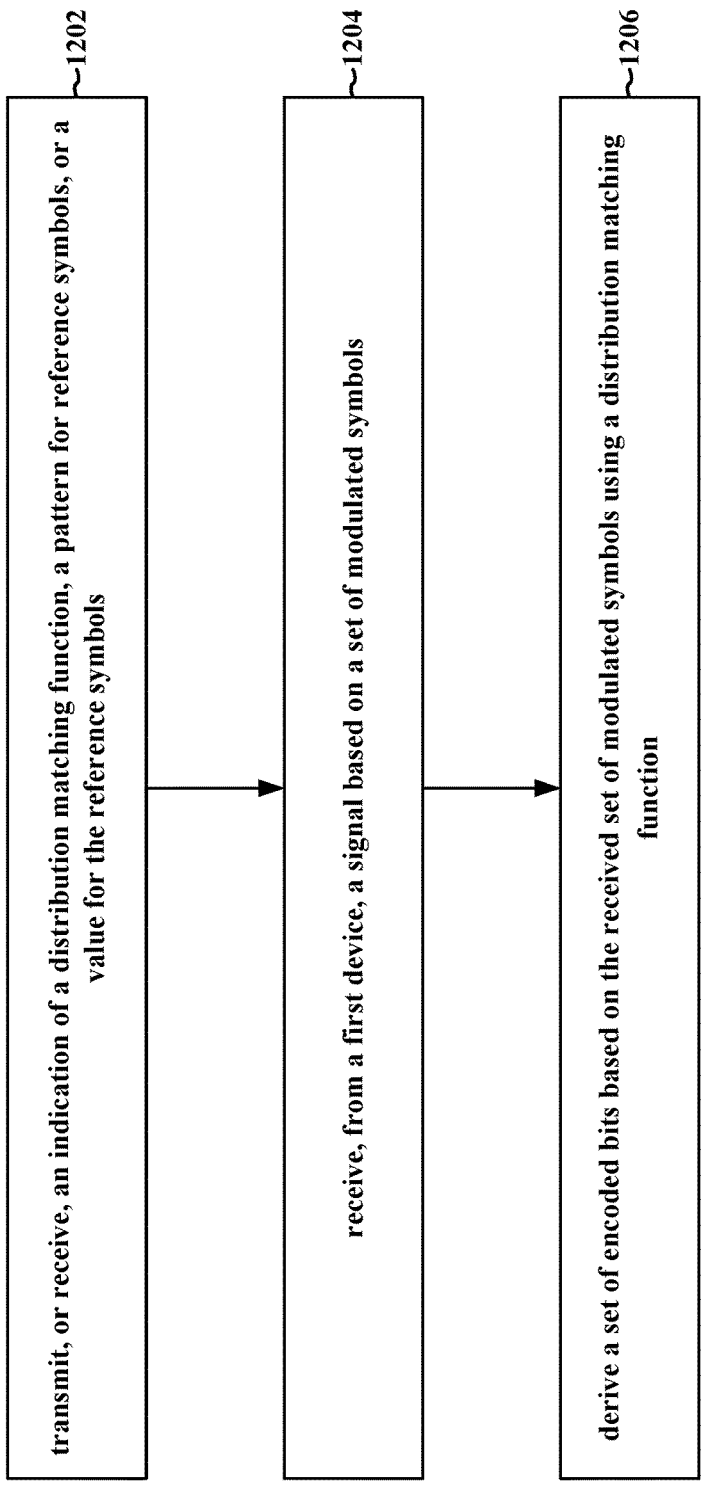
FIG. 12 is a flowchart of a method of wireless communication.

FIG. 12 is a flowchart 1200 of a method of wireless communication. The method may be performed by a base station (e.g., the base station 102, 702, or 802; the network entity 1402), a UE (e.g., the UE 104, 704, or 804; the apparatus 1304), or other wireless communication device. For the description of flowchart 1200, the method will be described as being performed by a base station to simplify the description. At 1202, the base station may transmit, or receive, an indication of a at least one of a distribution matching function, a pattern for reference symbols, or a value for the reference symbols. For example, 1202 may be performed by application processor 1306, cellular baseband processor 1324, transceiver(s) 1322, antenna(s) 1380, and/or PAPR reduction component 198 of FIG. 13 or CU processor 1412, DU processor 1432, RU processor 1442, network processor 1412, transceiver(s) 1446, antennas 1480, and/or PAPR reduction component 198 of FIG. 14. The indication of the distribution matching function or reference symbol pattern or value, in some aspects, may be transmitted, or received, in an information element. The indication of the distribution matching function or reference symbol pattern or value, in some aspects, may be transmitted, or received, via one or more of DCI and/or UCI, a MAC-CE, or RRC signaling individually or in combination, e.g., RRC signaling may be used to transmit, or receive, a set of candidate configurations that are activated by one or more of a MAC-CE or DCI and/or UCI. The indication of the distribution matching function, in some aspects, may include an indication of one or more of a probability distribution of transitions between states, a distribution matching algorithm, and/or a LUT. In some aspects, the base station may receive the indication of the distribution matching function from a network node. The base station, in some aspects, may transmit the indication of the distribution matching function to a second wireless communication device. For example, referring to FIGS. 7 and 8, the base station 702/802 may transmit, and the UE 704/804 may receive, the PAPR reduction configuration 706/806.

At 1204, the base station may receive a signal based on a set of modulated symbols. For example, 1204 may be performed by application processor 1306, cellular baseband processor 1324, transceiver(s) 1322, antenna(s) 1380, and/or PAPR reduction component 198 of FIG. 13 or CU processor 1412, DU processor 1432, RU processor 1442, network processor 1412, transceiver(s) 1446, antennas 1480, and or PAPR reduction component 198 of FIG. 14. In some aspects, the set of modulated symbols may further be based on at least one reference symbol. The at least one reference symbol, in some aspects, may include a plurality of reference symbols associated with a set of known positions (and a corresponding set of known values for symbols at the set of known positions) in the set of modulated symbols. An indication of the set of known positions and the corresponding set of known values for the at least one reference symbol, in some aspects, may be included in the indication of the distribution matching function transmitted, or received, at 1202 and/or may be transmitted, or received, by the base station as a separate indication via one or more of the DCI and/or UCI, a MAC-CE, or RRC signaling as described in relation to the indication of the distribution matching function. Each reference symbol may be used to define a set of subsequent symbols based on the amplitude symbols. The set of modulated symbols, in some aspects, may be associated with at least one of a QAM or PSK modulation (e.g., pi/4 QPSK modulation). For example, referring to FIGS. 6-8, the base station 702 (or a UE 804) may receive the reduced PAPR transmission 714 (or 814) corresponding to signal 601.

Finally, at 1206, the base station may derive a set of encoded bits based on the received set of modulated symbols using a distribution matching function. For example, 1206 may be performed by application processor 1306, cellular baseband processor 1324, and/or PAPR reduction component 198 of FIG. 13 or CU processor 1412, DU processor 1432, RU processor 1442, network processor 1412, and or PAPR reduction component 198 of FIG. 14. Deriving the set of encoded bits, in some aspects, may include a set of operations in a processing pipeline such as a FFT function, an equalization function, a DFT function, and an LLR computation function used to generate a soft input 606 that may be used to derive the set of encoded bits using the distribution matching function. Based on the distribution matching function (e.g., indicated at 1202) the base station may generate an inverse distribution matching function to map the modulated symbols received at 1204 to a set of values for the encoded bits (the expected values for the encoded bits at the transmitting device). The set of encoded bits (or set of values for the encoded bits) may be a set of soft bits to be decoded by a decoder (e.g., a subsequent decoding step). For example, referring to FIGS. 6-8, the base station 702 (or a UE 804) may derive at 716 (or at 816) a set of encoded bits based on the reduced PAPR transmission 714 (or 814) corresponding to signal 601, e.g., based on the set of modulated symbols generated at 712 (or at 812). Deriving the encoded bits at 716 (or at 816), in some aspects, may include processing signal 601 through the first group of operations and/or components 602 to produce the soft input 606 and then applying the inverse distribution matching function 603 to produce the set of soft encoded bits 607 for processing by decoder 604 to produce bits 605.

After deriving the set of encoded bits (e.g., a set of soft bits or a soft output) at 1206, the base station may decode the set of encoded bits to generate (e.g., derive or determine) a set of information bits. For example, referring to FIGS. 6-8, the base station 702 (or a UE 804) may decode, at 718 (or at 818), the set of encoded bits generated at 716 (or at 816) corresponding to set of soft encoded bits 607 to produce bits 605.

Figure 13:
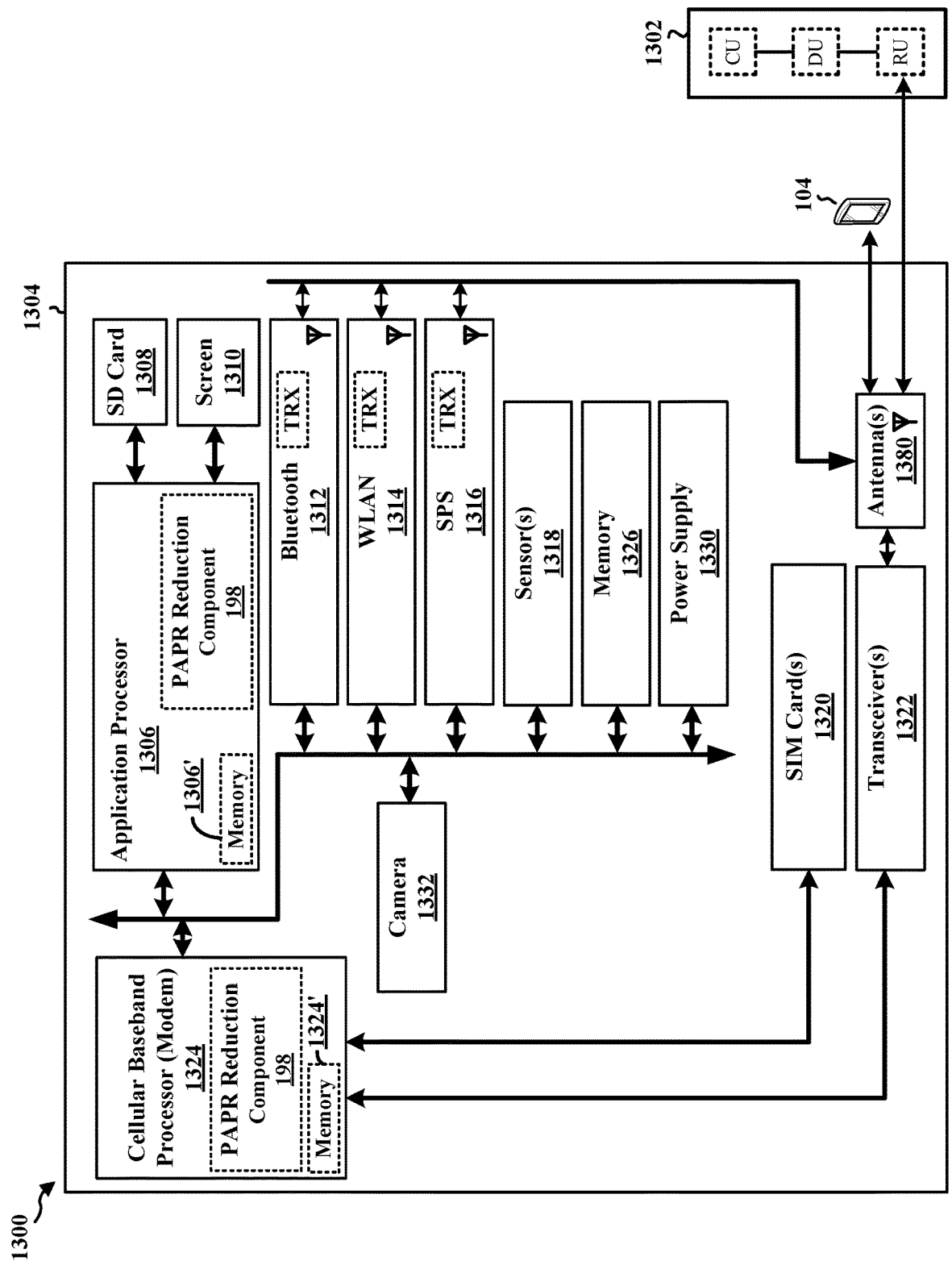
FIG. 13 is a diagram illustrating an example of a hardware implementation for an apparatus.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the PAPR reduction component 198 may, in some aspects, be configured to encode a set of information bits with a channel encoder; generate, based on a set of encoded bits from the channel encoder, a set of amplitude symbols using a distribution matching function; generate a set of modulated symbols based on the set of amplitude symbols; and transmit, to a second device, a signal based on the set of modulated symbols. The PAPR reduction component 198 may be configured to perform any of the aspects described in connection with the flowchart in FIG. 9, FIG. 10, and/or the aspects performed by the UE in FIG. 7, and/or the base station in FIG. 8. Additionally, or alternatively, the PAPR reduction component 198 may be configured to receive, from a first device (e.g., a transmitting device), a signal based on a set of modulated symbols and derive a set of encoded bits based on the received set of modulated symbols using a distribution matching function. The PAPR reduction component 198 may be configured to perform any of the aspects described in connection with the flowchart in FIG. 11, FIG. 12, and/or the aspects performed by the UE in FIG. 8, and/or the base station in FIG. 9. The PAPR reduction component 198 may be within the cellular baseband processor 1324, the application processor 1306, or both the cellular baseband processor 1324 and the application processor 1306. The PAPR reduction component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may, in some aspects, include means for encoding a set of information bits with a channel encoder; means for generating, based on a set of encoded bits from the channel encoder, a set of amplitude symbols using a distribution matching function; means for generating a set of modulated symbols based on the set of amplitude symbols; means for transmitting, to a second device, a signal based on the set of modulated symbols; means for receiving, from a network node, an indication of the distribution matching function; means for transmitting an indication of the distribution matching function to the second device (e.g., a UE) to use to receive the signal. The apparatus may include means for performing any of the aspects described in connection with the flowchart in FIG. 9, FIG. 10, and/or the aspects performed by the UE in FIG. 7, and/or the base station in FIG. 8. In some aspects, the apparatus 1304 may include means for receiving, from a first device, a signal based on a set of modulated symbols; means for generating a set of encoded bits based on the set of modulated symbols using a distribution matching function. The PAPR reduction component 198 may be configured to perform any of the aspects described in connection with the flowchart in FIG. 11, FIG. 12, and/or the aspects performed by the UE in FIG. 8, and/or the base station in FIG. 9. The means may be the PAPR reduction component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
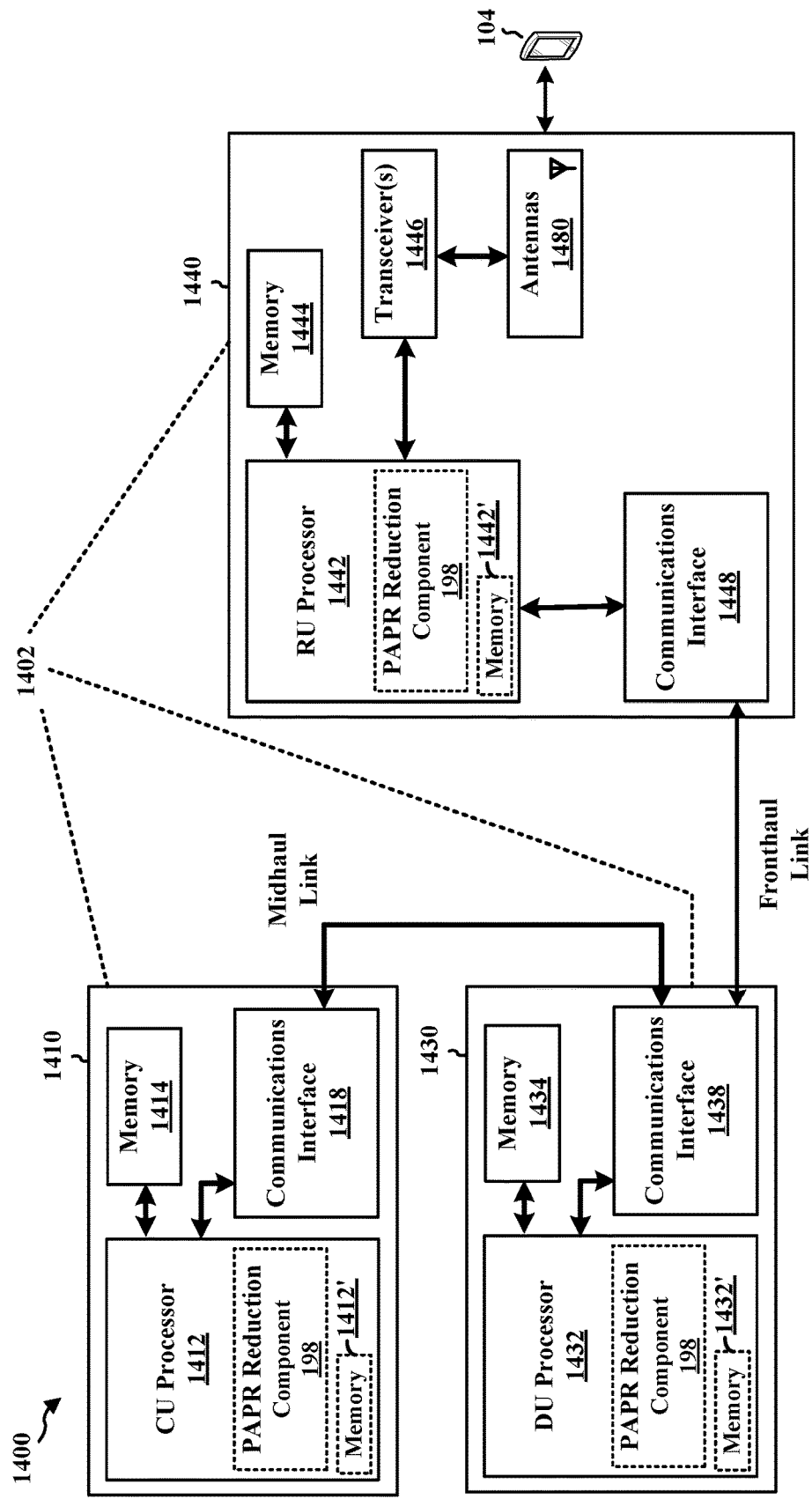
FIG. 14 is a diagram illustrating an example of a hardware implementation for a network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the PAPR reduction component 198, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the PAPR reduction component 198 may be configured to encode a set of information bits with a channel encoder; generate, based on a set of encoded bits from the channel encoder, a set of amplitude symbols using a distribution matching function; generate a set of modulated symbols based on the set of amplitude symbols; and transmit, to a second device, a signal based on the set of modulated symbols. The apparatus may include means for performing any of the aspects described in connection with the flowchart in FIG. 9, FIG. 10, and/or the aspects performed by the UE in FIG. 7, and/or the base station in FIG. 8. Additionally, or alternatively, the PAPR reduction component 198 may be configured to receive, from a first device (e.g., a transmitting device), a signal based on a set of modulated symbols and derive a set of encoded bits based on the received set of modulated symbols using a distribution matching function. The PAPR reduction component 198 may be configured to perform any of the aspects described in connection with the flowchart in FIG. 11, FIG. 12, and/or the aspects performed by the UE in FIG. 8, and/or the base station in FIG. 7. The PAPR reduction component 198 may be within one or more processors of one or more of the CU 1410, DU 1430, and the RU 1440. The PAPR reduction component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for means for encoding a set of information bits with a channel encoder; means for generating, based on a set of encoded bits from the channel encoder, a set of amplitude symbols using a distribution matching function; means for generating a set of modulated symbols based on the set of amplitude symbols; means for transmitting, to a second device, a signal based on the set of modulated symbols; means for receiving, from a network node, an indication of the distribution matching function. The network entity may include means for performing any of the aspects described in connection with the flowchart in FIG. 9, FIG. 10, and/or the aspects performed by the UE in FIG. 7, and/or the base station in FIG. 8. In some aspects, the network entity 1402 may include means for transmitting an indication of the distribution matching function to the second device (e.g., a UE) to use to receive the signal; means for receiving, from a first device, a signal based on a set of modulated symbols; means for generating a set of encoded bits based on the set of modulated symbols using a distribution matching function. The network entity may include means for performing any of the aspects described in connection with the flowchart in FIG. 11, FIG. 12, and/or the aspects performed by the UE in FIG. 8, and/or the base station in FIG. 7. The means may be the PAPR reduction component 198 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

As discussed above, in some aspects of wireless communication, a non-linearity of a PA at a transmitting device may result in distortions of signals and increased EVM at a receiving device. The non-linearity may be experienced at higher powers, e.g., past a saturation point. In order to maintain linearity of the PA, a transmitter may employ a backoff that sacrifices total power to reduce distortion to the signal. When transmitting a waveform associated with a higher PAPR, a transmitting device may use a larger backoff to maintain linearity of the PA. In order to increase total power for a particular waveform, a method may be employed to reduce the PAPR associated with the particular waveform to allow for a smaller backoff.

A method and apparatus are described above that provide PAPR reduction for DFT-s-OFDM by introducing constraints on the phase transition between two consecutive modulation symbols. The method and apparatus may provide a set of modulation symbols for which transitions between consecutive symbols follows a known, or configured, distribution. The method and apparatus may also be associated with new signaling to indicate the known, or configured, distribution of transitions between consecutive symbols. In some aspects, the method and apparatus are associated with a distribution matching function and/or component that implements and/or enforces the known, or configured, distribution after a set of bits is encoded and before a modulation operation. The placement of the distribution matching function and/or component after the encoding, in some aspects, allows for a simplified distribution matching algorithm and/or implementation of the distribution matching.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method, at a first device for wireless communication, to improve a PAPR in at least one of a single-carrier FDM signal or DFT-s-OFDM, the method including encoding a set of information bits with a channel encoder; generating, based on a set of encoded bits from the channel encoder, a set of amplitude symbols using a distribution matching function; generating a set of modulated symbols based on the set of amplitude symbols; and transmitting, to a second device, a signal based on the set of modulated symbols.

Aspect 2 is the method of aspect 1, where the set of amplitude symbols indicates a set of phases that are used to generate the set of modulated symbols.

Aspect 3 is the method of any of aspects 1 and 2, where the set of modulated symbols is further based on at least one reference symbol.

Aspect 4 is the method of aspect 3, where the at least one reference symbol includes a plurality of reference symbols associated with a set of known positions in the set of modulated symbols.

Aspect 5 is the method of any of aspects 1 to 4, where the set of modulated symbols is associated with at least one of a QAM or PSK modulation.

Aspect 6 is the method of any of aspects 1 to 5, where the first device is a UE and the second device is a network node, the method further including receiving, from the network node, an indication of at least one of the distribution matching function, a pattern for reference symbols, or a value for the reference symbols, wherein the indication is comprised in one of DCI, a MAC-CE, or RRC signaling, the indication of the distribution matching function comprises an indication of one or more of a probability distribution of phase transition magnitudes between states, a distribution matching algorithm, or a LUT, and the set of amplitude symbols is generated using the distribution matching function indicated by the network node.

Aspect 7 is the method of aspect 6, where the indication of the distribution matching function comprises an information element.

Aspect 8 is the method of any of aspects 1 to 5 or 7, the method further including transmitting an indication of the distribution matching function to the second device to use to receive the signal.

Aspect 9 is the method of any of aspects 1 to 8, where the first device is a network node and the second device is a UE.

Aspect 10 is a method, at a second device for wireless communication, to improve a PAPR in at least one of a single-carrier FDM signal or DFT-s-OFDM, the method including receiving, from a first device, a signal based on a set of modulated symbols and deriving a set of encoded bits based on the received set of modulated symbols using a distribution matching function.

Aspect 11 is the method of aspect 10, where the set of modulated symbols is further based on at least one reference symbol.

Aspect 12 is the method of aspect 11, where the at least one reference symbol includes a plurality of reference symbols associated with a set of known positions in the set of modulated symbols.

Aspect 13 is the method of any of aspects 10 to 12, where the set of modulated symbols is associated with at least one of a QAM or PSK modulation.

Aspect 14 is the method of any of aspects 10 to 13, where the second device is a UE and the first device is a network node, the method further including receiving an indication of the distribution matching function from the network node.

Aspect 15 is the method of aspect 14, where the indication of the distribution matching function comprises an information element.

Aspect 16 is the method of any of aspects 10 to 13 or 15, where the second device is a network node and the first device is a UE the method further including transmitting, to the UE, an indication of the distribution matching function to use in transmitting the signal.

Aspect 17 is an apparatus for wireless communication at a device including a memory and at least one processor coupled to the memory and, based at least in part on information stored in the memory, the at least one processor is configured to implement any of aspects 1 to 16.

Aspect 18 is the method of aspect 17, further including a transceiver or an antenna coupled to the at least one processor.

Aspect 19 is an apparatus for wireless communication at a device including means for implementing any of aspects 1 to 16.

Aspect 20 is a computer-readable medium (e.g., a non-transitory computer-readable medium) storing computer executable code, where the code when executed by a processor causes the processor to implement any of aspects 1 to 16.

What is claimed is:

1. An apparatus for wireless communication to improve a peak to average power ratio (PAPR) in at least one of a single-carrier frequency division multiplexed (FDM) signal or discrete Fourier transform (DFT) spread orthogonal frequency division multiplexing (OFDM) (DFT-s-OFDM) at a first device, comprising:
    memory; and
    at least one processor coupled to the memory and, based at least in part on information stored in the memory, the at least one processor is configured to:
        encode a set of information bits with a channel encoder;
        generate, based on a set of encoded bits from the channel encoder, a set of amplitude symbols using a distribution matching function;
        generate a set of modulated symbols based on the set of amplitude symbols, wherein the set of amplitude symbols indicates a set of phases that are used to generate the set of modulated symbols; and
        transmit, to a second device, a signal based on the set of modulated symbols.

2. The apparatus of claim 1, wherein the set of modulated symbols is further based on at least one reference symbol.

3. The apparatus of claim 2, wherein the at least one reference symbol includes a plurality of reference symbols associated with a set of known positions in the set of modulated symbols.

4. The apparatus of claim 1, wherein the set of modulated symbols is associated with at least one of a QAM or PSK modulation.

5. The apparatus of claim 1, wherein the first device is a user equipment (UE) and the second device is a network node, the at least one processor further configured to:
    receive, from the network node, an indication of at least one of the distribution matching function, a pattern for a set of reference symbols, or a value for reference symbols in the set of reference symbols, wherein the indication is comprised in one of downlink control information (DCI), a media access control (MAC) control element (CE) (MAC-CE), or radio resource control (RRC) signaling, the indication of the distribution matching function indicating one or more of a probability distribution of phase transition magnitudes between states, a distribution matching algorithm, or a look up table (LUT), and the set of amplitude symbols is generated using the distribution matching function indicated by the network node.

6. The apparatus of claim 5, wherein the indication of the distribution matching function comprises an information element.

7. The apparatus of claim 1, further comprising at least one of a transceiver or antenna, the at least one processor further configured to:
    transmit, via the at least one of the transceiver or the antenna, an indication of the distribution matching function to the second device to use to receive the signal.

8. The apparatus of claim 7, wherein the first device is a network node and the second device is a user equipment (UE).

9. An apparatus for wireless communication to improve a peak to average power ratio (PAPR) in at least one of a single-carrier frequency division multiplexed (FDM) signal or discrete Fourier transform (DFT) spread orthogonal frequency division multiplexing (OFDM) (DFT-s-OFDM) at a second device, comprising:
    memory; and
    at least one processor coupled to the memory and, based at least in part on information stored in the memory, the at least one processor is configured to:
        receive, from a first device, a signal based on a set of modulated symbols;
        receive an indication of a distribution matching function associated with a probability distribution of phase transition magnitudes between states of modulated symbols in the set of modulated symbols; and
        derive a set of encoded bits based on the set of modulated symbols using the distribution matching function.

10. The apparatus of claim 9, wherein the set of modulated symbols is further based on at least one reference symbol.

11. The apparatus of claim 10, wherein the at least one reference symbol includes a plurality of reference symbols associated with a set of known positions in the set of modulated symbols.

12. The apparatus of claim 9, wherein the set of modulated symbols is associated with at least one of a QAM or PSK modulation.

13. The apparatus of claim 9, wherein the second device is a user equipment (UE) and the first device is a network node, the at least one processor further configured to:
    receive, from the network node, further indication of at least one of a pattern for a set of reference symbols, or a value for reference symbols in the set of reference symbols, wherein the indication is comprised in one of downlink control information (DCI), a media access control (MAC) control element (CE) (MAC-CE), or radio resource control (RRC) signaling, the indication of the distribution matching function indicates one or more of a distribution matching algorithm, or a look up table (LUT).

14. The apparatus of claim 13, wherein the indication of the distribution matching function comprises an information element.

15. The apparatus of claim 9, further comprising at least one of a transceiver or antenna, wherein the second device is a network node and the first device is a user equipment (UE), the at least one processor further configured to:
transmit, to the UE, an additional indication of the distribution matching function to use in transmitting the signal via the at least one of the transceiver or the antenna.

16. A method, at a first device for wireless communication, to improve a peak to average power ratio (PAPR) in at least one of a single-carrier frequency division multiplexed (FDM) signal or discrete Fourier transform (DFT) spread orthogonal frequency division multiplexing (OFDM) (DFT-s-OFDM), the method comprising:
encoding a set of information bits with a channel encoder;
generating, based on a set of encoded bits from the channel encoder, a set of amplitude symbols using a distribution matching function;
generating a set of modulated symbols based on the set of amplitude symbols, wherein the set of amplitude symbols indicates a set of phases that are used to generate the set of modulated symbols; and
transmitting, to a second device, a signal based on the set of modulated symbols.

17. The method of claim 16, wherein the set of modulated symbols is further based on at least one reference symbol.

18. The method of claim 17, wherein the at least one reference symbol includes a plurality of reference symbols associated with a set of known positions in the set of modulated symbols.

19. The method of claim 16, wherein the set of modulated symbols is associated with at least one of a QAM or PSK modulation.

20. The method of claim 16, wherein the first device is a user equipment (UE) and the second device is a network node, the method further comprising:
receiving, from the network node, an information element indicating at least one of the distribution matching function, a pattern for a set of reference symbols, or a value for reference symbols in the set of reference symbols, wherein the information element is comprised in one of downlink control information (DCI), a media access control (MAC) control element (CE) (MAC-CE), or radio resource control (RRC) signaling, the distribution matching function indicating one or more of a probability distribution of phase transition magnitudes between states, a distribution matching algorithm, or a look up table (LUT), and the set of amplitude symbols is generated using the distribution matching function indicated by the network node.

21. The method of claim 16, the method further comprising:
transmitting an indication of the distribution matching function to the second device to use to receive the signal.

22. A method, at a second device for wireless communication, to improve a peak to average power ratio (PAPR) in at least one of a single-carrier frequency division multiplexed (FDM) signal or discrete Fourier transform (DFT) spread orthogonal frequency division multiplexing (OFDM) (DFT-s-OFDM), the method comprising:
receiving, from a first device, a signal based on a set of modulated symbols;
receiving or transmitting an indication of a distribution matching function associated with a probability distribution of phase transition magnitudes between states of modulated symbols in the set of modulated symbols; and
deriving a set of encoded bits based on the set of modulated symbols using the distribution matching function.

23. The method of claim 22, wherein the set of modulated symbols is further based on at least one reference symbol.

24. The method of claim 23, wherein the at least one reference symbol includes a plurality of reference symbols associated with a set of known positions in the set of modulated symbols.

25. The method of claim 22, wherein the set of modulated symbols is associated with at least one of a QAM or PSK modulation.

26. The method of claim 22, wherein the second device is a user equipment (UE) and the first device is a network node, the method further comprising:
receiving a further indication of at least one of the distribution matching function, a pattern for a set of reference symbols, or a value for reference symbols in the set of reference symbols, wherein the indication is comprised in one of downlink control information (DCI), a media access control (MAC) control element (CE) (MAC-CE), or radio resource control (RRC) signaling, the indication of the distribution matching function indicates one or more of a distribution matching algorithm, or a look up table (LUT).

27. The method of claim 26, wherein the indication of the distribution matching function comprises an information element.

28. The method of claim 22, wherein the second device is a network node and the first device is a user equipment (UE), the method further comprising:
transmitting, to the UE, an additional indication of the distribution matching function to use in transmitting the signal.

* * * * *